US009446523B2

(12) United States Patent
Linnell

(10) Patent No.: US 9,446,523 B2
(45) Date of Patent: *Sep. 20, 2016

(54) PROGRAMMING OF A ROBOTIC ARM USING A MOTION CAPTURE SYSTEM

(71) Applicant: Autofuss, San Francisco, CA (US)

(72) Inventor: Jeffrey Linnell, San Francisco, CA (US)

(73) Assignee: Autofuss, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/712,579

(22) Filed: May 14, 2015

(65) Prior Publication Data

US 2015/0246443 A1  Sep. 3, 2015

Related U.S. Application Data

(63) Continuation of application No. 14/195,412, filed on Mar. 3, 2014, now Pat. No. 9,056,396.

(60) Provisional application No. 61/773,077, filed on Mar. 5, 2013.

(51) Int. Cl.
  *B25J 9/16* (2006.01)
  *G05B 19/427* (2006.01)

(52) U.S. Cl.
  CPC ............ *B25J 9/1697* (2013.01); *G05B 19/427* (2013.01); *G05B 2219/36442* (2013.01); *G05B 2219/37563* (2013.01)

(58) Field of Classification Search
  USPC ......... 701/408; 345/156; 700/245, 264, 253, 700/259, 258; 901/1, 47, 46; 414/1, 2, 3
  See application file for complete search history.

(56) References Cited

U.S. PATENT DOCUMENTS

| 6,860,878 | B2 | 3/2005 | Brock |
| 7,297,142 | B2 | 11/2007 | Brock |
| 8,386,079 | B1 | 2/2013 | Kohler et al. |
| 8,467,904 | B2 | 6/2013 | Dariush |
| 2005/0251290 | A1 | 11/2005 | Skourup et al. |
| 2009/0055019 | A1 | 2/2009 | Stiehl et al. |
| 2009/0132088 | A1 | 5/2009 | Taitler |
| 2010/0222924 | A1 | 9/2010 | Gienger et al. |
| 2012/0328395 | A1 | 12/2012 | Jacobsen et al. |
| 2013/0211587 | A1* | 8/2013 | Stephens, Jr. .......... B25J 9/1689 700/246 |
| 2013/0211594 | A1 | 8/2013 | Stephens |
| 2013/0245824 | A1 | 9/2013 | Barajas et al. |
| 2014/0320408 | A1* | 10/2014 | Zagorsek ................ G06F 3/017 345/158 |
| 2015/0029092 | A1* | 1/2015 | Holz ...................... G06F 3/017 345/156 |

* cited by examiner

*Primary Examiner* — Ronnie Mancho
(74) *Attorney, Agent, or Firm* — McDonnell Boehnen Hulbert & Berghoff LLP

(57) ABSTRACT

An example method includes receiving position data indicative of position of a demonstration tool. Based on the received position data, the method further includes determining a motion path of the demonstration tool, wherein the motion path comprises a sequence of positions of the demonstration tool. The method additionally includes determining a replication control path for a robotic device, where the replication control path includes one or more robot movements that cause the robotic device to move a robot tool through a motion path that corresponds to the motion path of the demonstration tool. The method also includes providing for display of a visual simulation of the one or more robot movements within the replication control path.

20 Claims, 18 Drawing Sheets

PROGRAMMING OF A ROBOTIC ARM USING A MOTION CAPTURE SYSTEM

CROSS REFERENCE TO RELATED APPLICATION

The present application is a continuation of U.S. patent application Ser. No. 14/195,412 filed on Mar. 3, 2014, which claims priority to U.S. Provisional patent application Ser. No. 61/773,077 filed on Mar. 5, 2013, the entire contents of each of which are incorporated herein by reference, as if fully set forth in this description.

BACKGROUND

Unless otherwise indicated herein, the materials described in this section are not prior art to the claims in this application and are not admitted to be prior art by inclusion in this section.

Motion control is a type of automation, where the position of an object or objects is controlled using some type of device such as a robotic arm. In the production of videos, films, commercials, movies, and other such audiovisual works, the placement and movement of a camera and objects in a scene being captured by the camera is a major consideration and source of time and expense. In the film industry, motion control is used when a camera is mounted and controlled as part of the creation and recording of a video scene. This technique is commonly referred to as motion control photography.

SUMMARY

The present disclosure provides methods and apparatuses that allow for capturing motions of a demonstration tool and using the captured motions to cause a robotic device to replicate motions of the demonstration tool with a robot tool. A motion capture system may use one or more cameras to capture positions of the demonstration tool over time (e.g., as a user demonstrates some type of activity). A motion path for a robot tool (e.g., an end-effector-mounted tool on the robotic device) may be determined to replicate the motion path of the demonstration tool. The robotic device may then be controlled to move its robot tool along the motion path to replicate the motions of the demonstration tool.

In one example, a method is provided that includes receiving data from one or more cameras indicative of position of a demonstration tool. Based on the received data, the method may further include determining a motion path of the demonstration tool, where the motion path includes a sequence of positions of the demonstration tool. The method may also include determining a replication control path for a robotic device, where the replication control path includes one or more robot movements that cause the robotic device to move a robot tool through a motion path that corresponds to the motion path of the demonstration tool. The method may further include causing the robotic device to move the robot tool using the one or more robot movements within the replication control path.

In a further example, a system including a demonstration tool, a robotic device, at least one camera, and a control system is disclosed. The control system may be configured to receive data from the at least one camera indicative of position of the demonstration tool. Based on the received data, the control system may further be configured to determine a motion path of the demonstration tool, where the motion path includes a sequence of positions of the demonstration tool. The control system may also be configured to determine a replication control path for the robotic device, where the replication control path includes one or more robot movements that cause the robotic device to move a robot tool through a motion path that corresponds to the motion path of the demonstration tool. The control system may additionally be configured to cause the robotic device to move the robot tool using the one or more robot movements within the replication control path.

In another example, a non-transitory computer readable medium having stored therein instructions, that when executed by a computing system, cause the computing system to perform functions is disclosed. The functions may include receiving data from one or more cameras indicative of position of a demonstration tool. Based on the received data, the functions may further include determining a motion path of the demonstration tool, where the motion path includes a sequence of positions of the demonstration tool. The functions may also include determining a replication control path for a robotic device, where the replication control path includes one or more robot movements that cause the robotic device to move a robot tool through a motion path that corresponds to the motion path of the demonstration tool. The functions may further include causing the robotic device to move the robot tool using the one or more robot movements within the replication control path.

In yet another example, a system may include means for receiving information reports relating to driving conditions from a plurality of autonomous vehicles within a fleet of autonomous vehicles. The system may also include means for receiving data from one or more cameras indicative of position of a demonstration tool. Based on the received data, the system may further include means for determining a motion path of the demonstration tool, where the motion path includes a sequence of positions of the demonstration tool. The system may also include means for determining a replication control path for a robotic device, where the replication control path includes one or more robot movements that cause the robotic device to move a robot tool through a motion path that corresponds to the motion path of the demonstration tool. The system may further include means for causing the robotic device to move the robot tool using the one or more robot movements within the replication control path.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
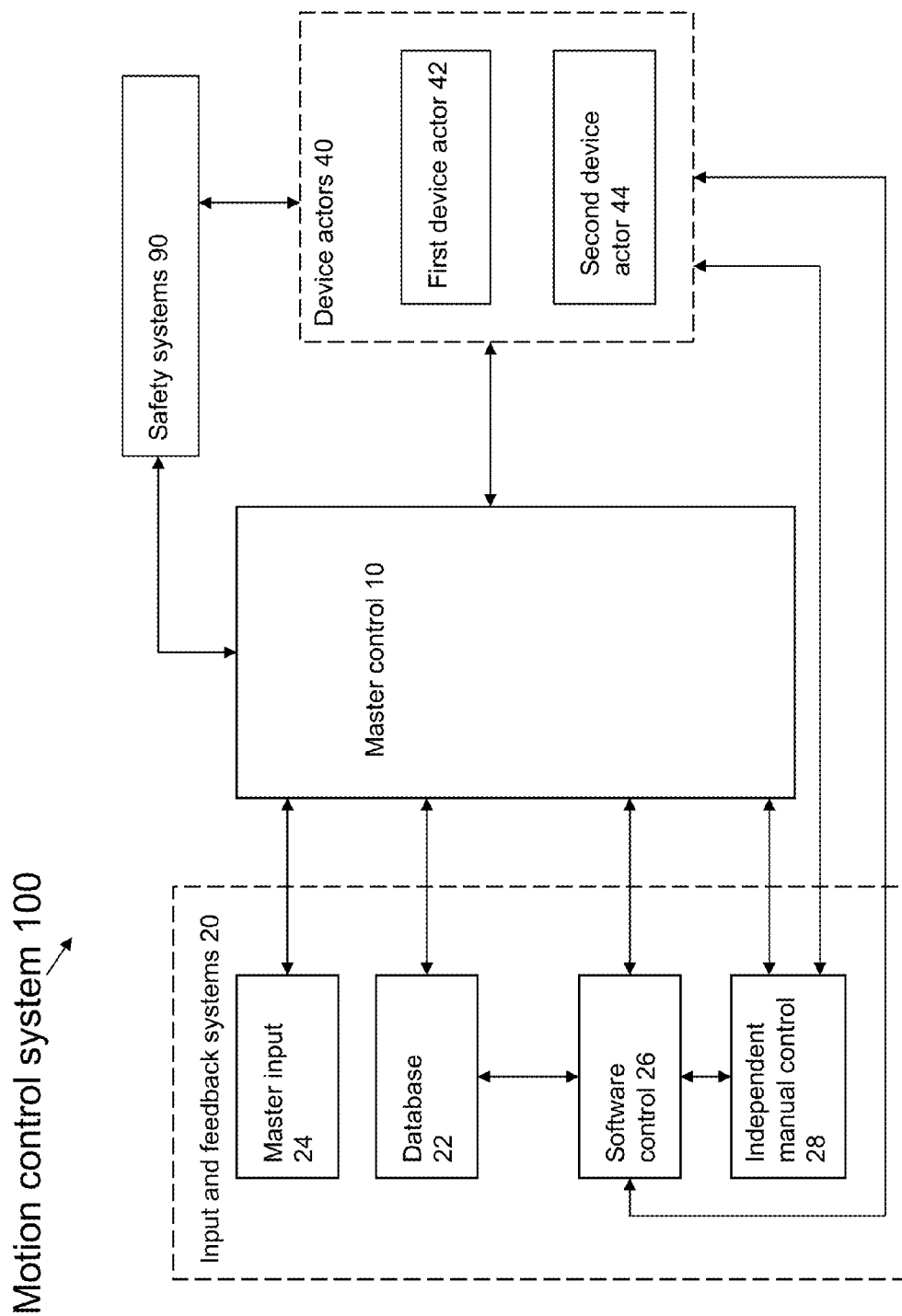
FIG. 1 shows a block diagram of a motion control photography system including a master scene control, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Example embodiments may include or otherwise relate to a motion-capture system that may be used to record positions of a moving demonstration tool, and then use the recorded positions to program a robotic device. For example, an actor may demonstrate some type of activity using one of a number of possible different demonstration tools. A motion capture system may use one or more optical sensors to determine a motion path followed by the demonstration tool. The motion path of the demonstration tool may indicate the position of the tool (e.g., translation and orientation) over a series of timesteps. From the motion path of the demonstration tool, a motion path for a separate robot tool (e.g., an end-effector-mounted tool on a robotic device) may be derived. The robotic device may then be controlled in order to move its robot tool through the sequence of positions within the derived motion path. In some embodiments, by capturing the position of the demonstration tool precisely (e.g., 100 times a second or 1,000 times a second), a robotic device may be trained to move a tool in much the same manner as a human demonstrator.

Such a system may be useful for a wide variety of applications, and may be particularly useful in applications where it may be difficult to program a robot to move in the same nuanced manner as a human. For example, applications may exist in cinema (e.g., to control a camera), manufacturing (e.g., to control a welding tool), and/or design (e.g., to control a paint brush), among other possibilities.

In order to capture motion of the demonstration tool, one or more cameras may be directed toward an actor as the actor demonstrates how to use the tool. In some examples, precise motion capture may be achieved by attaching control markers onto the demonstration tool at one or more points. The control markers may be passive markers (e.g., colored points detectable by a camera when lighted) or active markers which generate their own signal (e.g., light emitting diodes). In further examples, some or all of the control markers may have one or more distinguishing characteristics that can be distinguished by a camera in order to determine which points on the demonstration tool are moving. A combination of different types of markers may also be used.

In additional examples, a user of the demonstration tool may be shown a display with a visual simulation of how the motion of the tool will be replicated by a robotic device. For example, the visual simulation may show a virtual robot actor that simulates robot movements that will be followed by the robotic device to use a robot tool based on the demonstration. In some examples, the visual simulation may also show one or more visual curves and/or numerical values corresponding to motion characteristics of the robotic device (e.g., joint angles, velocities, and/or accelerations). By watching the visual simulation, the user may be able to adjust movements of the demonstration tool on the fly to better train the robotic device. In additional examples, the demonstration tool may contain a button which controls when movements of the demonstration tool are recorded by the motion capture system.

In further examples, a warning signal may be provided to the user when the demonstrated movements are approaching or have exceeded one or more predefined constraints of the robotic device. Accordingly, the user may be able to adjust movements of the demonstration tool in order to stay within the feasible range of motion of the robotic device. In additional examples, the display for the visual simulation may be attached to or included within the demonstration tool (e.g., when the demonstration tool is a camera, a sub-window of a viewing screen of the camera may show the visual simulation).

In some examples, a replication control path consisting of robot movements of the robotic device may be determined that cause the robotic device to move the robot tool through captured positions of the demonstration tool. For instance, a sequence of joint angles of one or more joints of the robot may be determined that cause the robot to position an end-effector-mounted robot tool over a timeline. In some examples, a mapping between motion parameters of the robot (including joint angles, joint velocities, and/or joint accelerations) and corresponding positions of the robot tool may be determined in order to enable the robot to move an end-effector-mounted tool through a motion path that corresponds to the motion path of the demonstration tool. In further examples, the control path may sometimes be refined before it is used by the robotic device to replicate the movements of the demonstration tool. For example, motion curves within the control path may be smoothed (e.g., to avoid jerking movements by the robot). In another example, a visual simulation (e.g., animation of projected robot movements) may be displayed to the user through a graphical interface that allows the user to make adjustments to the robot movements within the control path during a review phase before the robotic device replicates the movements.

In other examples, multiple review and replication phases may be used in order to iteratively improve the motion paths of the robotic actor. Through an iterative cycle, a robotic actor may be quickly trained to perform complicated motion paths. In other examples, separate review and replication phases may not exist. For instance, a robotic device may be controlled to use a robot tool in much the same way that a human demonstrator uses a demonstration tool in real time or approximately real time. Real time control may be useful in situations where the robotic device is operating in an area that is unsafe for a human, for example.

In further examples, the control path may cause the robotic device to move the robot tool by applying a certain scaling factor to captured positions of the demonstration tool. Accordingly, a small demonstration tool may be used to control a larger robot tool or a large demonstration tool may be used to control a smaller robot tool. For instance, a microscopic tool for surgery may be used by a robotic device based on demonstrated movements of a larger tool that can be more easily manipulated by a human surgeon.

After determining (and possibly refining) a control path for the robotic device, the robotic device may then be used to replicate the motion of the demonstration tool with its own robot tool. In some examples, the robotic activity may then be repeated many times (e.g., a robot trained to use a glue gun with the deft of a skilled human actor may be used to repeat the process hundreds or thousands of times in manufacturing). In further examples, positions of the robot tool may also be captured using motion capture (e.g., using LED tags and a camera). These positions may be used to verify and/or refine the control path of the robot by comparing the actual resulting positions of the robot tool to the previously recorded positions of the demonstration tool. Multiple iterations of this process may also be used to further refine the robot control path as well.

In additional examples, the demonstration tool may be controlled by forces of nature instead of or in addition to a human demonstrator. For instance, a ball with LED tags may be dropped and allowed to bounce as positions of the ball are captured by a camera. A robot may then instructed to control a robot tool (e.g., a ball held by an end-effector of the robot) through a series of movements that replicate the bouncing ball. Accordingly, a control path of robot movements that simulate an object's changing position resulting from physical forces may be determined which may result in a more accurate simulation than trying to directly program the robot movements.

Example embodiments may involve use of a robotic control system to create automated programming of robotics arms using motion control. FIG. 1 describes an example motion control system 100. Motion control system 100 is part of a motion controlled set used to film a scene using motion control photography. Motion control system 100 comprises a master control 10, input and feedback systems 20, device actors 40, and safety systems 90. From the most basic perspective, motion control system 100 functions when an input system 20 provides instructions to a device actor 40 via master control 10.

For the purposes of the present invention, a scene comprises a set of motions and actions by device actors 40 over a continuous period of time, such that a set of players in front of a camera is recorded in video, sound, or both. The players are people, stationary objects, or objects controlled or moved by one or more devices of device actors 40. In one embodiment, the camera is mounted to a robot arm of device actors 40. At a beginning of a scene, a camera and a plurality of players begin in a first position. Motion control of device actors 40 moves the camera and the players through a sequence of motions to the end of a scene, with players and sound from the scene recorded using the camera and potentially other audio and video recording equipment to capture the motion.

In one potential embodiment as part of a motion control system 100, input and feedback systems 20 include a database 22, a master input 24, a software control 26, and an independent manual control 28. As part of the input and feedback systems 20, database 22 operates to provide a set of timing and position data to direct all or a portion of device actors 40. Alternatively, database 22 stores data being created by manual or individual movement or data input related to operation and function of device actors 40. Database 22 also stores data created independently of device actors 40, such as data created using software modeling features of a software control 26.

A master input 24 is any device that functions to operate all of the device actors 40 associated with a particular scene being created with motion control system 100. Master input 24 functions by sending input control signals to master control 10. Master control 10 then adapts the signal from master input 24 to send individual control signals to a plurality of actors operating as device actors 40 for the particular scene. In one potential embodiment, every individual device of device actors 40 is provided a control signal from master control 10 when a signal is received from master input 24, including a signal to maintain a status quo or non-action to devices that are not operating as device actors 40 for a particular scene. In an alternative embodiment, a portion of the device actors connected as part of motion control system 100 are not sent any signal from master control 10 as part of the operation of motion control system 100 for a particular scene.

Software control 26 acts as a replacement for master input 24 in sending control signals to the plurality of actors via the master control 10. Alternately, software control 26 controls individual devices from among device actors 40 to alternate, change, or experiment with motions of the individual device. In other potential embodiments, software control 26 functions to model the behavior of individual devices of device actors 40 within a virtual environment. In such an embodiment, software control 26 contains a software model for an individual device, which allows control signals to be created for the device without actually sending the control signals to the device. The control signals are then be stored in the software control 26, in database 22, within a computer memory component that is part of master control 10, or within computer memory that is part of the device of device actors 40 for which the controls are being created. After the control signal is created by software control 26 and propagated to the appropriate storage location, a master control signal from software control 26 or from master input 24 activates the control signal for the individual device to act in conjunction with other device actors 40.

Certain devices of device actors 40 additionally have an independent manual control 28. As described above with respect to software control 26, control signals for an individual device are created in software modeling. Similarly, a device may have independent manual control 28 that is used to operate a device of device actors 40. For example, in one potential embodiment, a device that is one of device actors 40 is a follow focus that controls the focus of a camera. The follow focus may have a control device that is designed to control the focus of the camera that may operate as an independent manual control. When a set of instructions is being created for the entire scene, the independent manual control 28 is given input commands over time that are recorded to database 22 or a memory device of master control 10. During creation of a set of instructions using independent manual control 28, the independent manual control 28 may communicate directly with the associated device of device actors 40. Alternatively, the independent manual control 28 may send the control signal to master control 10, which then conveys the signal to the associated device of device actors 40. The control signal may then be created either from the signal of the independent manual control 28, of from a measured feedback reading created by the operation of the associated device. Additionally, although in many situations it is preferable to have the independent manual control 28 actually control the associated device during control signal creation in order to view the results, control signals is created without controlling the device. For example, if expected input signals are expected for certain time marks, an independent manual control 28 is operated independent of the related device, and the control operation recorded. These function as ways in which instructions for individual device actors of device actors 40 is integrated into a motion controlled scene as part of motion control system 100.

The result of the integration described above is considered as a global timeline for a motion controlled scene. FIG. 5B, described in more detail below, provides an illustrated example, where the actions of multiple motion controlled actors are integrated into a global timeline using a master control. In FIG. 5B, various actors such as camera and lighting robots move at certain points during a scene. The actors may receive control signals during the entire scene from time a to time f, or may only receive controls when they actually move or act. Certain other actors, such as $1^{st}$ and $2^{nd}$ special effects (fx) actors only receive single commands to act at one specific time, such as $1^{st}$ fx actor acting at time b in the global timeline of FIG. 5B. Such an integration into a global timeline allows simplified user control of complex actions impacting an entire scene that may save significant amounts of time in modifying a particular scene with a given timeline. This allows scrubbing through time forward and backwards as well as seeking to specific frame number or timecode for all actors in a particular scene, and slowing down or speeding up the performance of the entire set (system) in real time via a hardware device.

Although embodiments will be illustrated with reference to specific implementations, a person of ordinary skill in the art will understand that these implementations describe innovations which may have broad use other than the specifically described implementations. As described below, enhanced control may comprise systems and methods for a variety of functions, including safety systems, playback speed control, forward and reverse position scrubbing, and integrated detection systems, among others.

Such a system includes advantages over systems currently known in the art by providing accessible and highly sophisticated robotic controls in an art environment dominated by custom toolsets without simple or malleable integration toolsets. Such a use of highly accurate control systems with cameras is considered, in certain embodiments, to be "cinematic automation" or "3D projection automation" which allows the ambitions of visual story tellers to be matched through the application of automation systems. For example, improved control systems can coordinate sub-millimeter position of a camera in space with the position of the light, an actress, a robotic actor comprising a 3D projection surface, and special effects (pyrotechnics, video playback, sound cues, etc.). This allows execution of highly complex shots that would previously have required the coordination of several film departments with manual human positioning. Such control systems remove inaccuracy and introduced the repeatability of robotics, through highly accurate computer synchronization of events. In addition to developing a faster, more rigid, safer, and easier to program robotic arm system, embodiments of the present innovations include interfaces that allow a creative director to make very quick on-set adjustments. In the high pressure environment of feature films and commercial productions, it is critical that a director or visual effects supervisor is able to make very quick creative or technical calls, and the systems described herein enable this in a way not known in the previous art.

As a further example, if a system implementation of the innovations is being used in presentation of a scene in a live play, the system might be synchronizing a large robotic arm, a custom robotic rig to move the arm, video playback of a wall of LED's that serve as the light source, and the motion of a piece of background, and an animatronic actor with facial features animated from a projector attached to an animation computer with arm and leg movement animated by robotics. This is a highly technical, pre-programmed scene that has been pre-visualized in a computer, and the interplay of all the elements have been choreographed using the system. Real time during the play, if the actors are delivering their lines at a slower than normal rate, or there is a need to pause for extra applause, a play director may compensate real time by pausing the entire set or by simply turning a knob at the right moment to accommodate the actors. The robot slows down, the robotic rig complies, and the entire scene of the play decelerates. All of this happens in synchronicity. Plus the system can provide integrated enhanced safety to prevent the actors from being injured.

Figure 2:
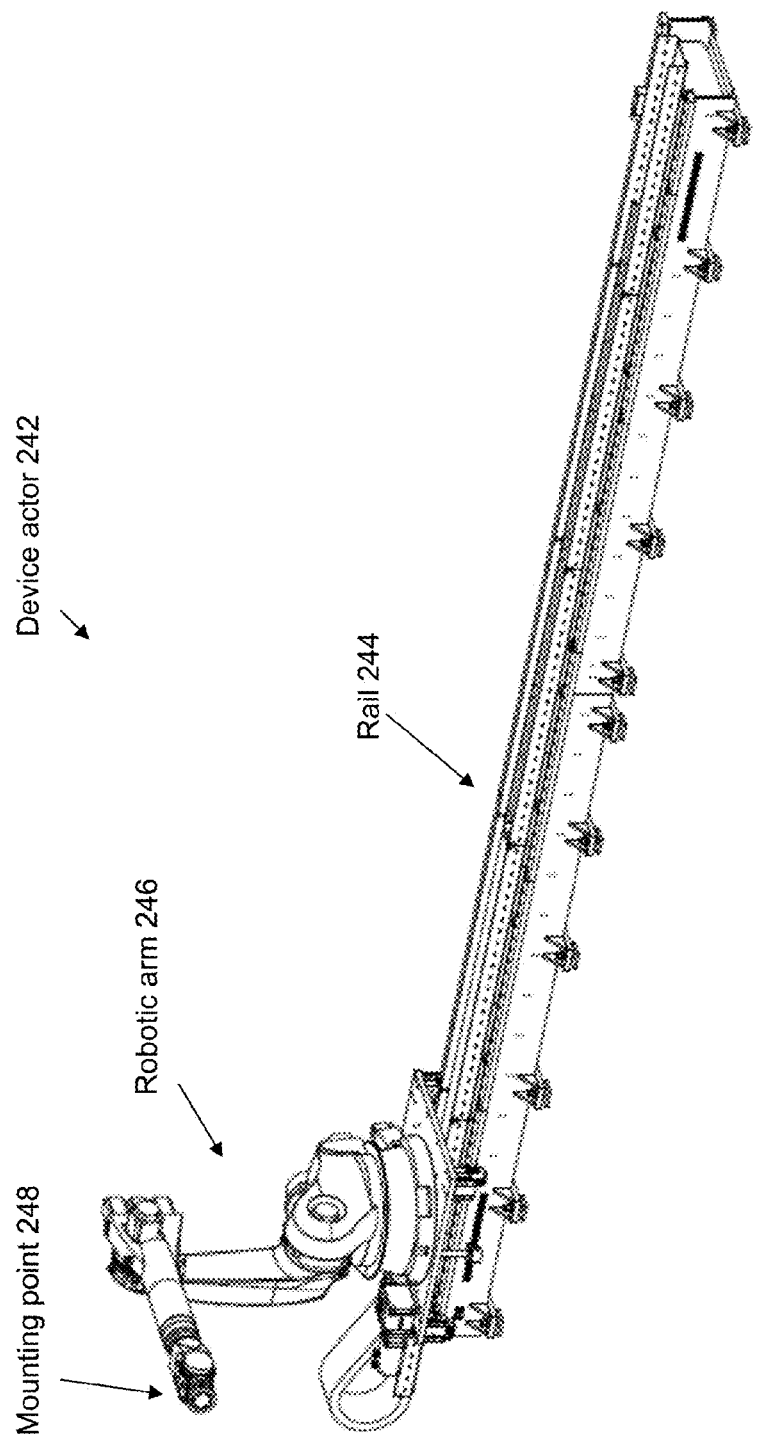
FIG. 2 shows a perspective view of a robot for use with a motion control photography system, according to an example embodiment.

Referring now to FIGS. 2-4, several non-limiting examples of device actors 40 will be described. Although these figures focus on the use of robotic arms, device actors is other types of devices that is stationary, such as sensors, stationary lights, and signal sources, as will be described later.

FIG. 2 describes device actor 242. Device actor 242 comprises robotic arm 246, mounting point 248, and rail 244. Device actor 242 is described in FIG. 2 with no specific functionality attached at any mounting point such as mounting point 248. Mounting point 248 is configured to hold a camera, a light, a player that will be filmed by a camera, or any other relevant device or object. In certain embodiments, instructions is given to position mounting point 248 at a specific location, and the positions of the axis of robotic arm 246 and of rail 244 is calculated by a process of the related motion control system. In alternative embodiments, each axis of robotic arm 246 and the position of rail 244 require separate, individual settings and control commands.

Figure 3A:
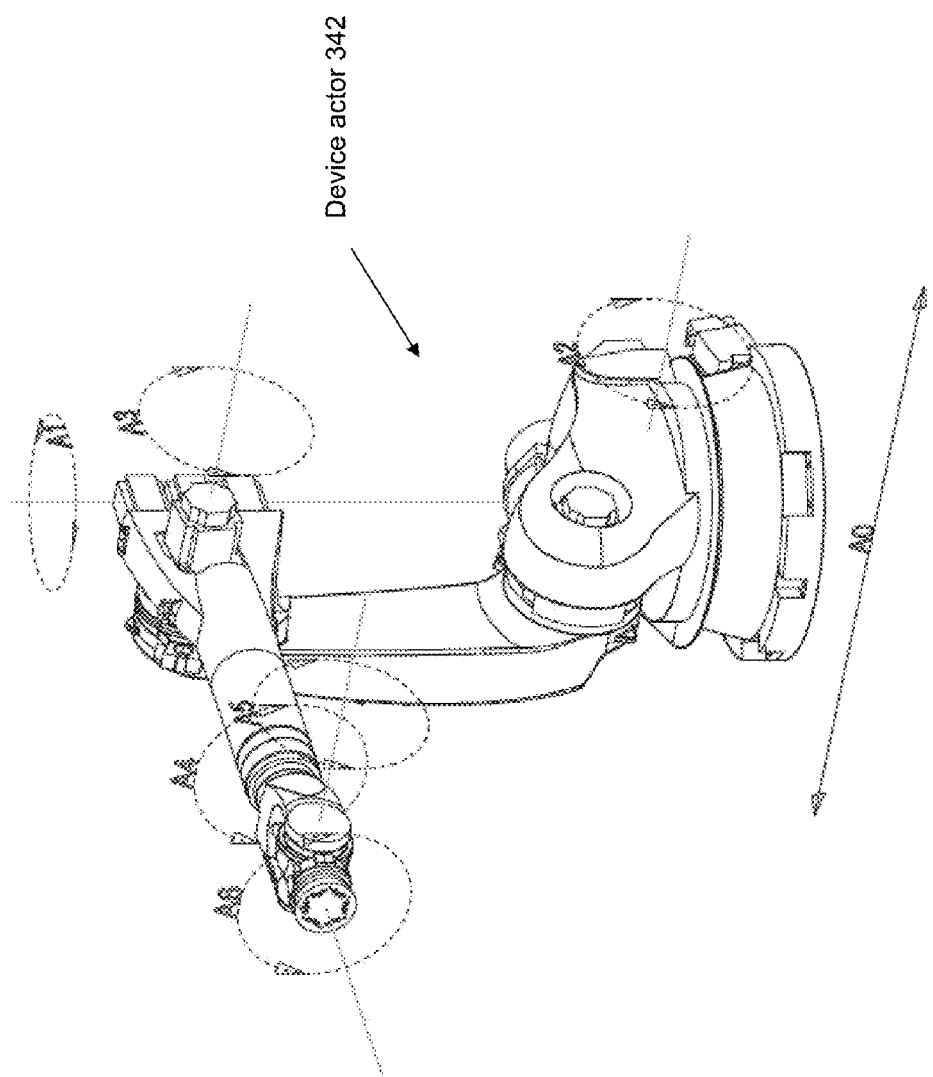
FIG. 3A shows a view of a robot with 7 degrees of freedom, according to an example embodiment.
Figure 3B:
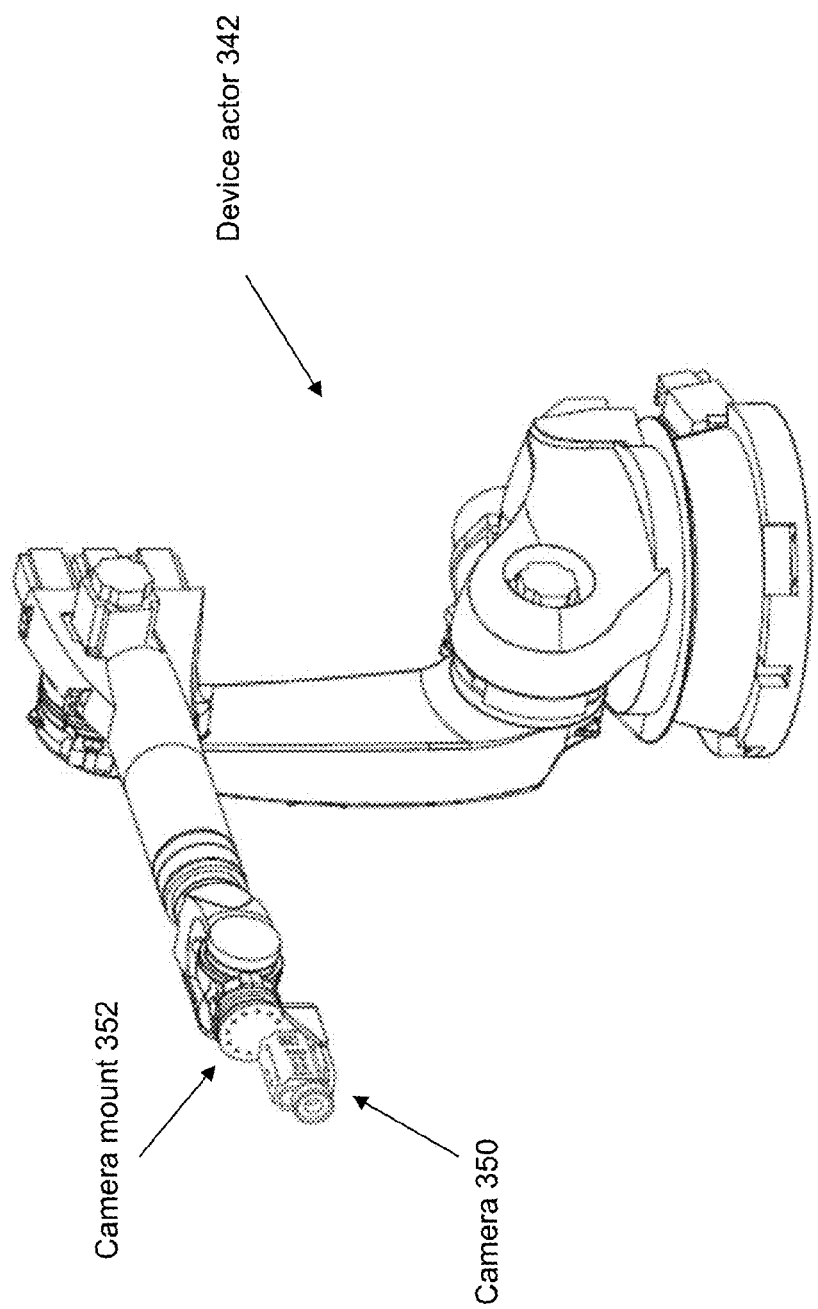
FIG. 3B shows a view of a robot with an attached camera, according to an example embodiment.
Figure 3C:
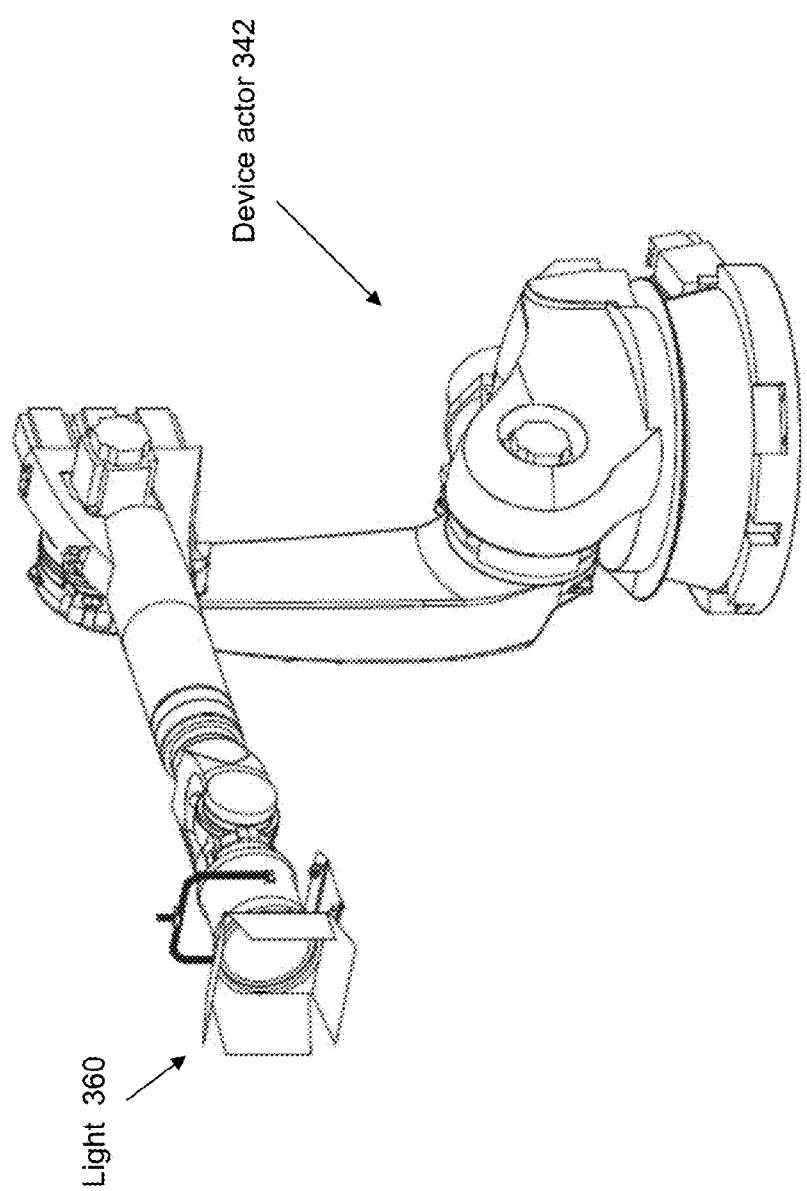
FIG. 3C shows a view of a robot with an attached lighting unit, according to an example embodiment.

FIG. 3A describes device actor 342, comprising a robotic arm with axis A1-A6, with axis A0 associated with a rail which is not shown that allows side to side movement of the other eight axes. FIG. 3B describes device actor 342 with a camera mount 352 placed at a mounting point, and camera 350 attached to camera mount 352. FIG. 3C describes device actor 342 with light 360 placed at a mounting point.

Figure 4B:
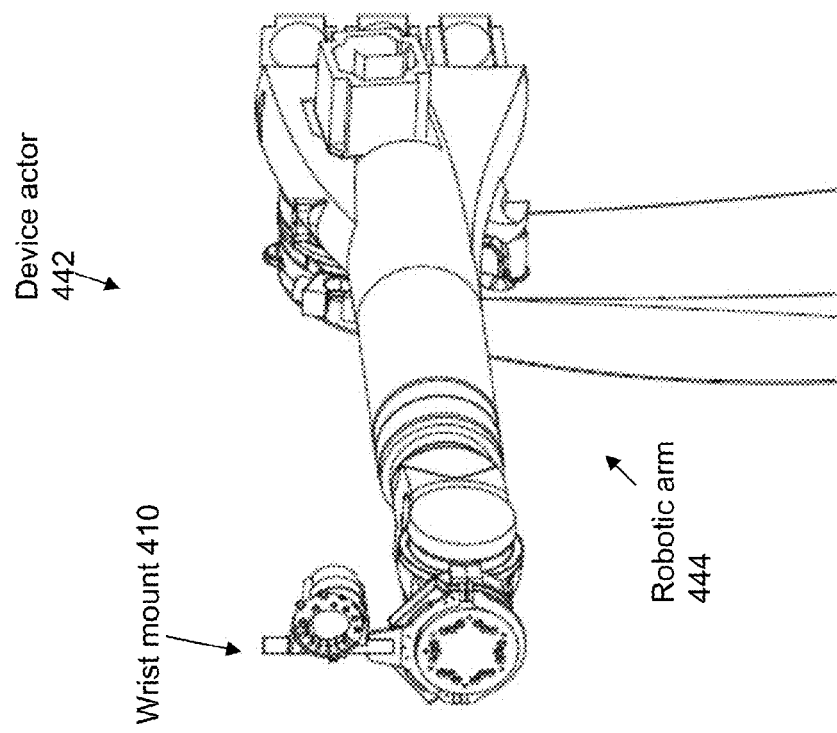
FIG. 4B shows a view of a robot with an attached wrist mount, according to an example embodiment.
Figure 4A:
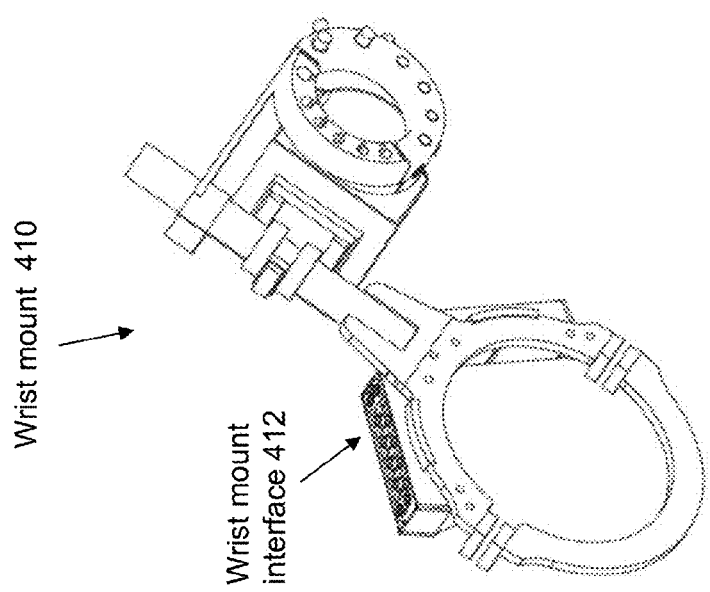
FIG. 4A shows a view of wrist mount for use with a robotic arm, according to an example embodiment.

FIGS. 4A and 4B describe an embodiment where a device actor 442 comprises a robotic arm 444 with a wrist mount 410 and a wrist mount interface 412. Wrist mount 410 and wrist mount interface 412 enables multiple device actors to be mounted to robotic arm 444 in addition to standard mounts such as a camera or lighting fixture. In certain embodiments, the wrist mount interface enables temperature sensors, laser range detectors, microphones, speakers, fans, or other mechanical activated or special effects devices.

Figure 5A:
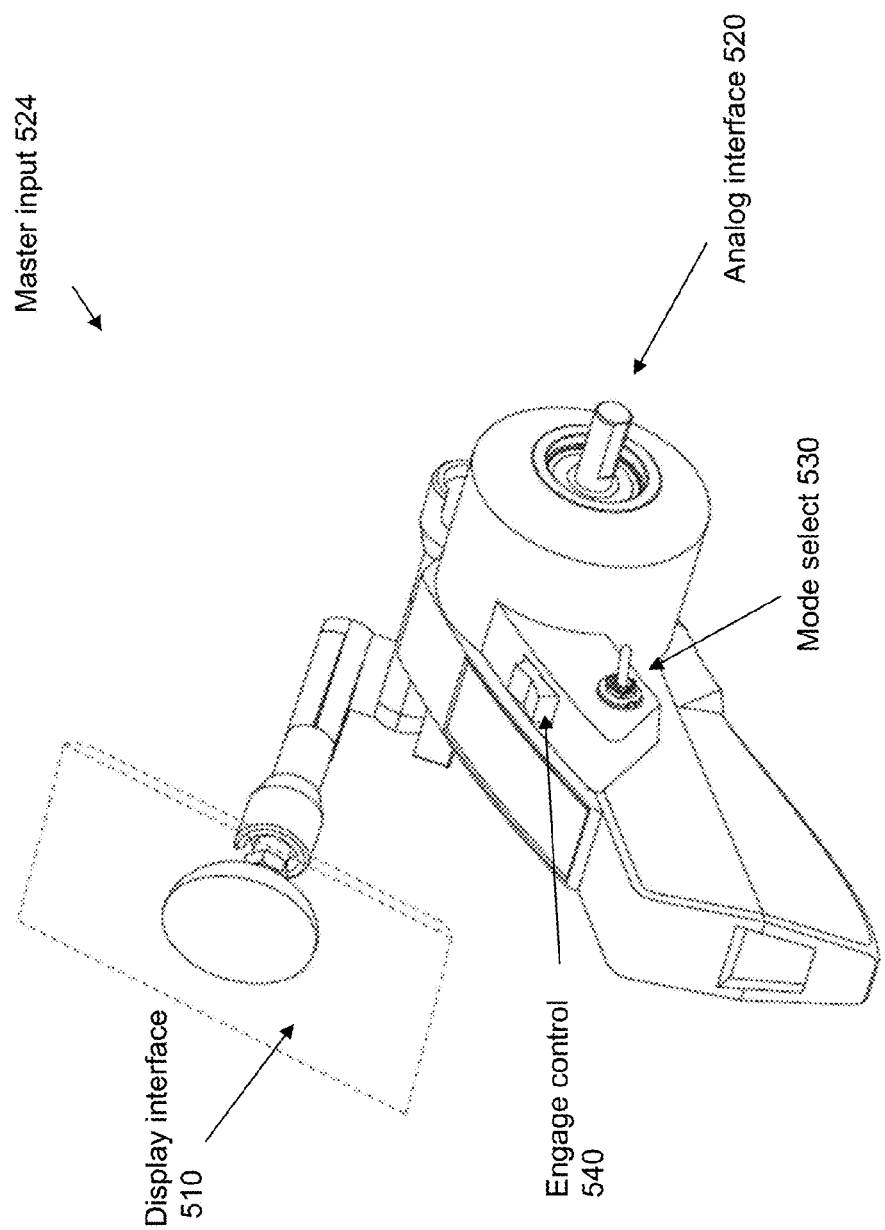
FIG. 5A shows one potential embodiment of a master input for use with a motion control system, according to an example embodiment.
Figure 5B:
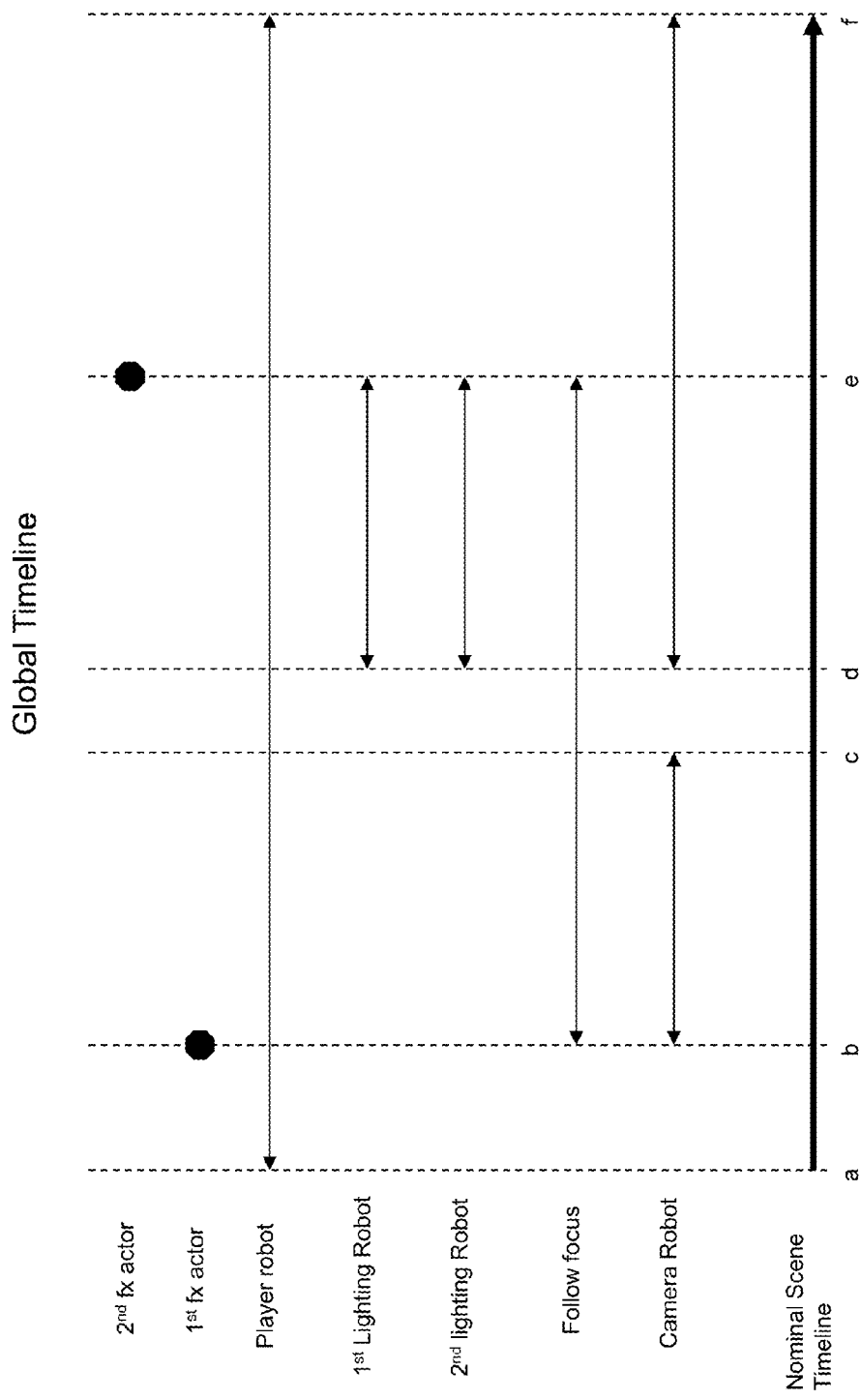
FIG. 5B illustrates a global timeline coordinating device actor positions through a master control, according to an example embodiment.

FIG. 5A describes master input 524 which is one potential implementation of a master input such as master input 24 of FIG. 1. Master input 524 comprises a display interface 510, and engage control 540, a mode select 530, and an analog interface 520. The function of master input 524 will be described in conjunction with the global timeline of FIG. 5B.

FIG. 5B illustrates a global timeline associated with one potential embodiment of a motion controlled scene implemented in a motion control system such as motion control system 100 of FIG. 1. FIG. 5B includes a number of actors, as defined above, which operate during a scene with a nominal or standard running time from time a to time f. The global timeline is nominal and not referring to real clock time because, as will be detailed further below, master input controls alters the rate at which actors progress through motions from the beginning of a scene to the end of a scene. The global timeline may therefore alternately be thought of as a coordinated position chart for actors. During the scene running time, an actor may act or move during the entire scene, during a portion of the scene, or only for one instant of a scene. Each actor, though, will have a predetermined point for each nominal time from the beginning to the end of the scene. The predetermined points for each actor are associated with predetermined points for each other actor.

In one potential embodiment, individual control signals for specific device actors are coordinated into a single file within a memory of a master control with a common base time provided by a master clock within the master control. During operation, master control extracts control signals for each device actor and provides individual control signals to each device actor at the appropriate intervals. In an alternative embodiment, a master control maintains separate individual control signal files and timing data for different device actors, and synchronizes the different control signals separately from the individual control files.

In another alternative embodiment, the control data for a portion of the device actors is transferred by a master control to a memory within an associated individual device actor. During operation, device actors having control data within memory receive only a synchronization signal that indicates a location in a global timeline, a rate of progress through a global timeline, or both.

The specific embodiment described in FIG. 5B includes a camera robot, a follow focus, two lighting robots, a player robot that controls an object that is to appear in front of a camera, and two special effects actors. As described above, each actor has a path to follow through the scene from beginning at time a to end at time f. In the specific embodiment of FIG. 5B, each actor begins at a preset position. As described by the global timeline, only the player robot moves from time a to time b. This will be true whether b occurs 10 seconds after starting time a, or 20 seconds after time a due to modification of the rate at which the scene progresses by a master input, as is further detailed below. At time b, $1^{st}$ special effects actor is activated with a single command, player robot continues moving, and follow focus and camera robot begin moving.

The chart of FIG. 5B is not meant to indicate that non-moving actors such as $1^{st}$ lighting robot, $2^{nd}$ lighting robot, and $2^{nd}$ fx actor during time a to time b are not receiving input commands. FIG. 5B merely illustrates a global position timeline. In certain embodiments they may not be receiving input commands from a master control. In alternative embodiments, however, non-moving actors such as $1^{st}$ lighting robot may periodically or continuously receive commands from a master control, even when not moving, where the command is an instruction not to move. Such a command may function to maintain synchronization, acting as a clock or a timing heartbeat to maintain synchronization. In some embodiments, real time adjustments are made to an actor during a scene. Such a clock or timing heartbeat further serves to provide synchronization data as the adjustments feed back to the master control to update and change the global timeline.

Referring back to FIG. 5A, master input 524 includes a display interface 510. Display interface 510 is a modular touch screen device that displays status information related to actors or the global timeline. For example, display interface 510 includes a scene time associated with the current position of the actors in the global timeline, or a frame number for a current scene associated with the current timeline. In such a display, time a, for example, or frame 1, is displayed when the actors are in position for the beginning of the scene. In one potential embodiment, display interface 510 is a portable electronic device or a cellular telephone with an interface application that communicates with a master control.

Master input 524 additionally comprises an engage control 540. Because of the size and force that many actors, particularly large industrial robot arms carrying heavy cameras moving at up to several meters per second, are capable of conveying in a collision, safety controls is extremely important for many embodiments of a motion controlled scene. Engage control 540 acts as an input regulator to prevent master input 524 from being operated by accident, such that engage control must be depressed at all times prior to any other input command being conveyed and acted upon from master input 524.

As shown in FIG. 5A, master input 524 also comprises a mode select 530 and an analog interface 520. Analog interface 520 is any input device capable of defining a range of inputs by a user control. In one potential embodiment, analog interface 520 is a wheel with a spring action that returns the wheel to a central position in the absence of user manipulation. In other potential embodiments, analog interface is a lever, a sliding tab, or any other input control to enable a user to input a signal. Master input 524 may comprise multiple input modes. In one potential embodiment, master input 524 comprise a reset mode, a play mode, and a scan mode, with the mode selectable via mode select 530.

In a reset mode, operation of engage control 540 and analog interface 520 operates to cause each actor within a scene to move to an initial position for the beginning of a global timeline. Additionally, a specific scene or frame number is selected by use of display interface 510, and operation causes each actor to move to a position associated with that frame or time in the global timeline. Such a mode may allow device actors that are out of position for a particular time to be reset to a correct position.

In a play mode, operation of analog interface 520 may serve to speed up or slow down progress through a scene in a global timeline. For example, in a scene with actors set in position at global time a, selecting engage control 540 may serve to begin the action of all actors through the global timeline at a base rate, where each second of time is associated with one second of progress through the global timeline. Operation of analog interface 520 in a first direction then serves to slow down progress through the global timeline, such that 1 second of real time is associated with 0.5 seconds of progress through the global timeline. If the analog interface 520 is then set back to center, the progress through the global timeline will revert to a one to one ration with real time, but with the remaining actions being delayed from the initial start by the previous slowdown. Conversely, if analog interface 520 is operated in a second direction opposite from the first direction, progress through the global timeline is increased. If, for example, the nominal time from time a to time b is 10 seconds, increasing progress through the global timeline by 10% may reduce that actual time required for the motion controlled scene to progress from the positions of time a to the positions of time b by approximately 0.9 seconds and the actual time required the progress from time a to time b with analog interface set to increase playback being approximately 9.1 seconds. This may provide use when a human player being recorded by a camera as part of a motion controlled scene is delivering lines more slowly or more quickly than expected, and there is a desire to match the actions of the motion controlled scenes with the actions of human players that are not motion controlled.

In a scan mode, selecting the engage control 540 and then operating analog interface 520 may operate to shuttle or scan forwards or backwards through the global timeline in a continuous fashion. For example, if a motion controlled set currently has actors in positions associated with time c, selecting shuttle mode and operating analog interface 520 in a first direction may cause all actors to move continuously forward through the positions associated with the global timeline to reach time d. Moving analog interface 520 in a second direction may cause all actors to move continuously backwards through the positions associated with the global timeline to reach the positions associated with time b. In one potential embodiment, a particular time or frame is selected using display interface 510. Operation of analog interface 520 may shuttle continuously through the positions of the global timeline until the particular time or frame is reached. Master input 524 may then cease to control device actors until a selection in display interface 510 is activated acknowledging that the previously selected point has been reached, or until analog interface 520 is returned to a central position.

Figure 6:
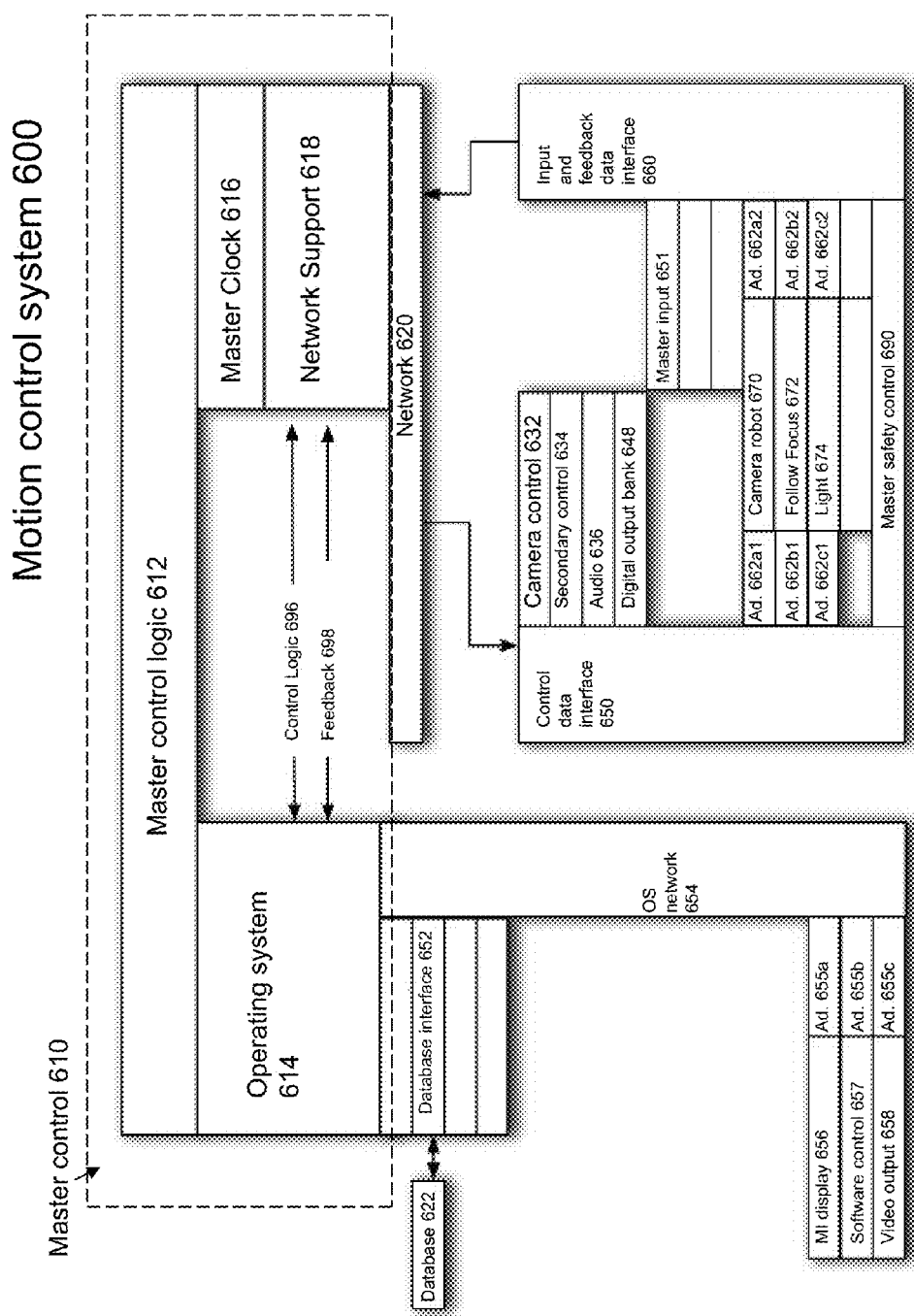
FIG. 6 shows a block diagram of a motion control photography system including a master scene control, according to an example embodiment.

FIG. 6 describes a block diagram of a motion control system 600. Motion control system 600 comprises a master control 610, as well as details of one potential embodiment of input, feedback, and device actor sub-systems. In the embodiment disclosed by motion control system 600, master control 610 comprises an operating system 614, master control logic 612, master clock 616, network support 618, control logic 696, and feedback 698. The elements of master control 610 are implemented in a computer system comprising a general function processor and memory hardware system. Alternatively, master control 610 is implemented in custom designed processing, memory, and networking hardware devices, or is implemented in an abstracted software layer of a general purpose computing system. Master clock 616 functions as a real time clock to coordinate movement of the actors in the system. Master control logic 612 functions to integrate the individual control signals into a master timeline, and to correctly route control signals to the correct device, both during operation of the entire motion control scene through the master timeline, and through individual modification and setting of device actor positioning and function using control logic 696. Master control logic 612 also assists in coordination and routing of feedback 698. Feedback 698 may include actual position and setting signals received from monitors attached to device actors. One potential example is a location device attached to a robot arm. The actual position of the arm is tracked via the location device to provide feedback and calibration in relation to an input position command sent to the arm from either database 622, software control 657, or another control input for the robot arm. Operating system 614 includes special libraries and functionality for interacting with device actors, and may further serve to manage basic hardware computing functionality such as memory storage and processor usage. Operating system 614 may further enable networking capability via OS network 654 to communicate with various related devices.

Network support 618 may also enable communications from master control 610 to related devices, actors, and input controls via network 620. In one potential embodiment, network 620 may comprise an EtherCAT network operating according to IEEE 1588. In such an embodiment, packets are no longer received, then interpreted and copied as process data at every connection. Instead, the frame is processed on the fly using a field bus memory management unit in each slave node. Each network node reads the data addressed to it, while the telegram is forwarded to the next device. Similarly, input data is inserted while the telegram passes through. The telegrams are only delayed by a few nanoseconds. On the master side commercially available standard network interface cards or on board Ethernet controller can be as hardware interface. The common feature of these interfaces is data transfer to the master control via direct memory access with no CPU capacity is taken up for the network access. The EtherCAT protocol uses an officially assigned Ether Type inside the Ethernet Frame. The use of this Ether Type allows transport of control data directly within the Ethernet frame without redefining the standard Ethernet frame. The frame may consist of several sub-telegrams, each serving a particular memory area of the logical process images that can be up to 4 gigabytes in size. Addressing of the Ethernet terminals can be in any order because the data sequence is independent of the physical order. Broadcast, Multicast and communication between slaves are possible. Transfer directly in the Ethernet frame is used in cases where EtherCAT components are operated in the same subnet as the master controller and where the control software has direct access to the Ethernet controller. Wiring flexibility in EtherCAT is further maximized through the choice of different cables. Flexible and inexpensive standard Ethernet patch cables transfer the signals optionally in Ethernet mode (100BASE-TX) or in E-Bus (LVDS) signal representation. Plastic optical fiber (POF) can be used in special applications for longer distances. The complete bandwidth of the Ethernet network, such as different fiber optics and copper cables, can be used in combination with switches or media converters. Fast Ethernet (100BASE-FX) or E-Bus can be selected based on distance requirements. The Fast Ethernet physics enables a cable length of 100 m between devices while the E-Bus line is intended for modular devices. The size of the network is almost unlimited since up to 65535 devices can be connected.

Further, such an embodiment using EtherCAT supports an approach for synchronization with accurate alignment of distributed clocks, as described in the IEEE 1588 standard.

In contrast to fully synchronous communication, where synchronization quality suffers immediately in the event of a communication fault, distributed aligned clocks have a high degree of tolerance from possible fault-related delays within the communication system.

Thus, data exchange is completely hardware based on "mother" and "daughter" clocks. Each clock can simply and accurately determine the other clocks run-time offset because the communication utilizes a logical and full-duplex Ethernet physical ring structure. The distributed clocks are adjusted based on this value, which means that a very precise network-wide time base with a jitter of significantly less than 1 microsecond is available.

However, high-resolution distributed clocks are not only used for synchronization, but can also provide accurate information about the local timing of the data acquisition. For example, controls frequently calculate velocities from sequentially measured positions. Particularly with very short sampling times, even a small temporal jitter in the displacement measurement leads to large step changes in velocity. In an embodiment comprising EtherCAT, the EtherCAT expanded data types (timestamp data type, oversampling data type) are introduced. The local time is linked to the measured value with a resolution of up to 10 ns, which is made possible by the large bandwidth offered by Ethernet. The accuracy of a velocity calculation then no longer depends on the jitter of the communication system. It is orders of magnitude better than that of measuring techniques based on jitter-free communication.

Finally, in an embodiment where network 620 comprises EtherCAT, a hot connect function enables parts of the network to be linked and decoupled or reconfigured "on the fly". Many applications require a change in I/O configuration during operation. The protocol structure of the EtherCAT system takes account of these changing configurations.

As described in FIG. 6, network 620 then interfaces with individual devices and actors via control data interface 650. Control data interface is part of network 620, or may comprise distributed components at the input of individual actors. Additionally, Input and feedback data interface is the same device as control data interface, acting as an opposite direction data flow of the same device interfacing with network 620. The actors interfacing with network 620 comprise camera control 632, secondary control 634, audio 636, digital output bank 648, camera robot 670, follow focus 672, light 674, master input 651, and master safety control 690.

In certain embodiments, some actors may communicate directly to network 620 via control data interface 650. For example, in the embodiment described above where network 620 is an EtherCAT network, camera control 632, secondary control 634, audio 636, and digital output bank 648 is able to communicate with no adapter through network 620. In such an embodiment, adapter 662a is an EtherCAT-provibus adapter for communicating with camera robot 670, adapter 662b is an EtherCAT-preston adapter for communicating with follow focus 672, and adapter 662c is an EtherCAT-dmx adapter for controlling light 674.

In addition to master control 610 and the devices communicating with master control 610 via network 620, motion control system 600 may comprise a plurality of other input, feedback, and devices such as OS network 654, database 622, database interface 652, MI display 656, software control 657, video output 658, and adapters 655a-c. In one potential embodiment, OS network 654 is an Ethernet network coupled to master control 610. MI display 656 may function as a display for master input 651 in a manner similar to the display described for master input 524 of FIG. 5A. Software control 657 may function as a software environment that may virtually create a global timeline for use with master control 610, and may also function to create a global timeline in real-time with live control of device actors. In one embodiment, software control 657 is a software program such as MAYA™ with supporting software add-ons. Finally, video output 658 is a real time video output associated with a camera in motion control system 600. As motion control system moves through a global timeline, video output may allow real time video review of a motion controlled set, such that individual device actors is modified, or a master input 651 controls is adjusted based on information from video output 658.

Figure 10:
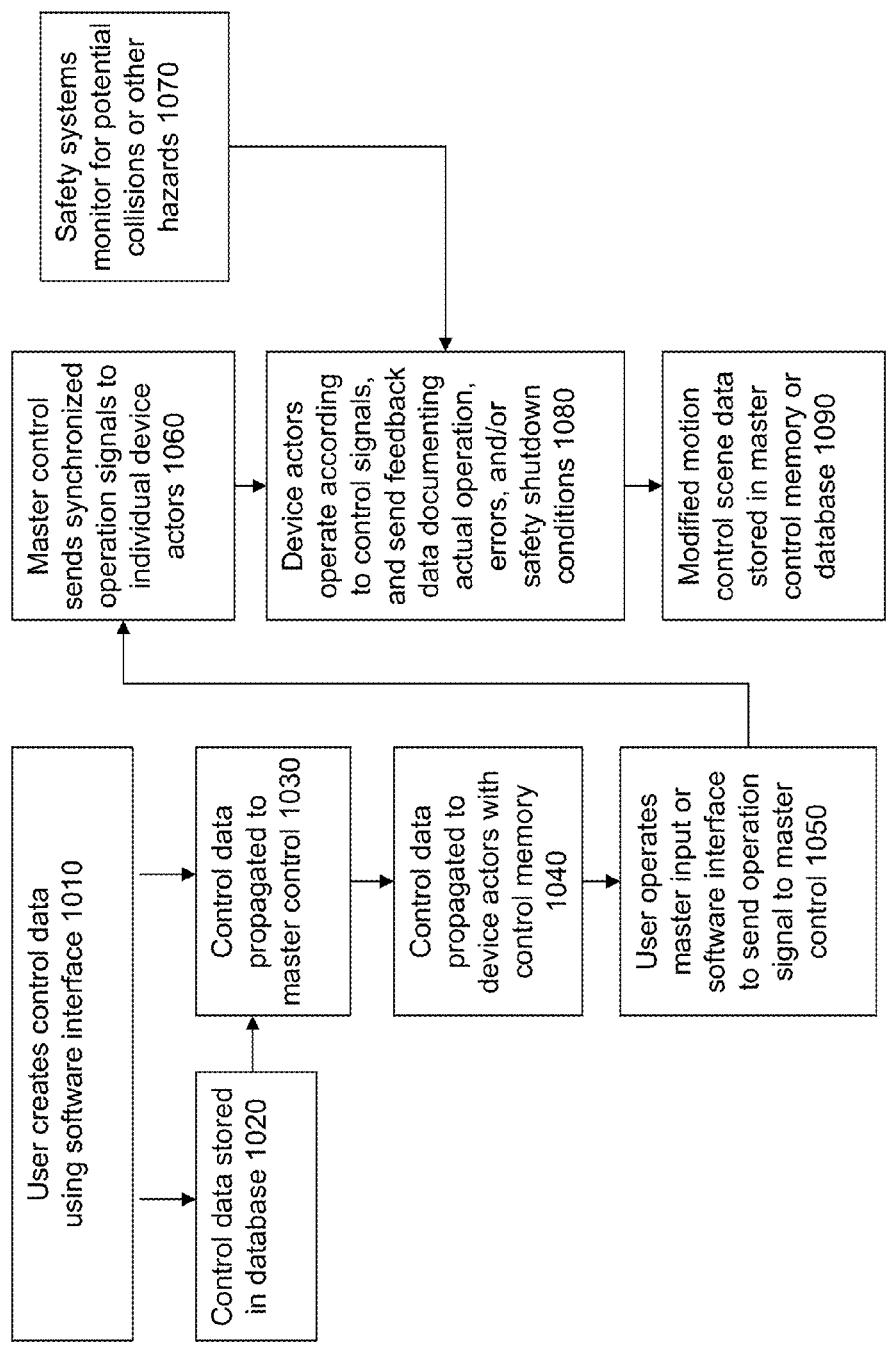
FIG. 10 illustrates a method of control, according to an example embodiment.

Motion control system 600 of FIG. 6 may then allow for function and creation of media in a variety of different ways, and described by FIG. 10. In an embodiment described by FIG. 10, a user may create control data using a software interface such as software control 657. The control data may then be stored in database 622 for future use. Alternatively or concurrently, the control data is sent to master control 610. The master control then manages control logic 696 and creates a global timeline, such that any data required by specific devices prior to function is communicated to those devices. For example, in one potential embodiment, camera robot 670 must have all position data prior to operation, with camera robot 670 functioning in synchronization with the global timeline by receiving a time or frame input and acting in response using previously received control information to move to the correct position for the current state of the global timeline. After the global timeline is prepared by master control 610, and all device actors are prepared, a user may use a master input 651 or a software control 657 to send an operation signal to master control 610. The master control then sends the appropriate control signals to individual device actors given the global timeline position and synchronization. The device actors then operate according to control signals, and send feedback signals via network 620 documenting actual operation, errors, and/or safety shut-down conditions. The feedback data can then be used to update the control signal managed by master control 610 to modify or match the original control data from the database 622 or software control 657.

In one potential embodiment, motion control system 600 comprises master safety control 690. Master safety control may comprise a hard wired shut down control connected directly to device actors identified as posing a safety risk. Such a shutdown control is attached to master input 651. In another potential embodiment, master safety control 690 comprises a safety computing system or a safety PLC attached to safety sensors. Such safety sensors may comprise object proximity detectors attached to a device actor. When a scene is created in motion control system 600, the scene will have data for expected device actors and for players appearing in the scene. Object proximity detectors is programmed or coupled to a computing system to filter expected objects with expected locations from unexpected objects and locations. If an object is detected by an object proximity detector in an unexpected and unsafe location, a signal is sent to shut down the entire motion controlled scene, or at a minimum, device actors determined to pose a potential danger to the unexpected object. In another potential embodiment, boundaries for a motion controlled scene are determined. Proximity detectors or motion detectors is configured to detect movement across a scene boundary or a device actor boundary during operation of the motion control system, and to halt operation when an unsafe motion or object is detected. In this fashion, master safety control may observes an area proximate to various device actors and transmit a safety shutdown signal. In one potential embodiment, an object detector comprises a light detection and ranging unit (LIDAR). In another potential embodiment, the object detector is a passive infrared sensor (PIR).

Figure 7:
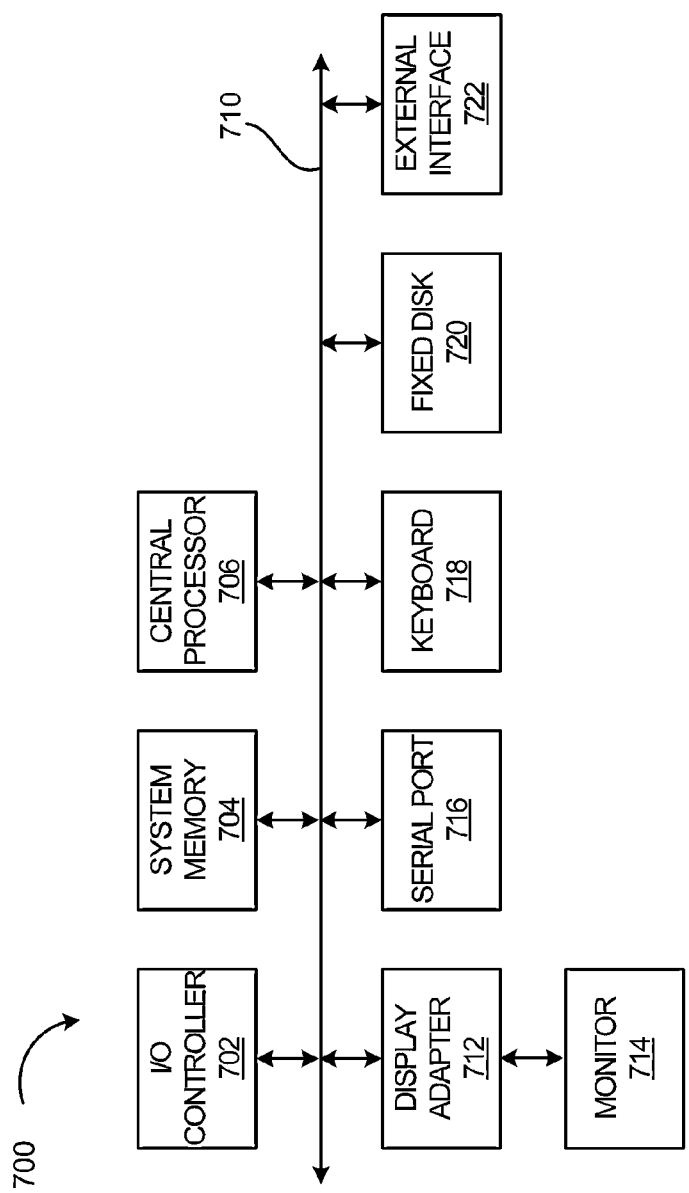
FIG. 7 shows one potential implementation of a computer or electronic device, according to an example embodiment.

FIG. 7 shows a block diagram of an exemplary computer apparatus that can be used in some embodiments of the invention (e.g., in the components shown in the prior Figures).

The subsystems shown in FIG. 7 are interconnected via a system bus 710. Additional subsystems such as a keyboard 718, fixed disk 720 (or other memory comprising computer readable media), monitor 714, which is coupled to display adapter 712, and others are shown. Peripherals and input/output (I/O) devices, which couple to I/O controller 702, can be connected to the computer system by any number of means known in the art, such as through serial port 716. For example, serial port 716 or external interface 722 can be used to connect the computer apparatus to a wide area network such as the Internet, a mouse input device, or a scanner. The interconnection via system bus 710 allows the central processor 706 to communicate with each subsystem and to control the execution of instructions from system memory 704 or the fixed disk 720, as well as the exchange of information between subsystems. The system memory 704 and/or the fixed disk 720 may embody a computer readable medium.

Figure 8:
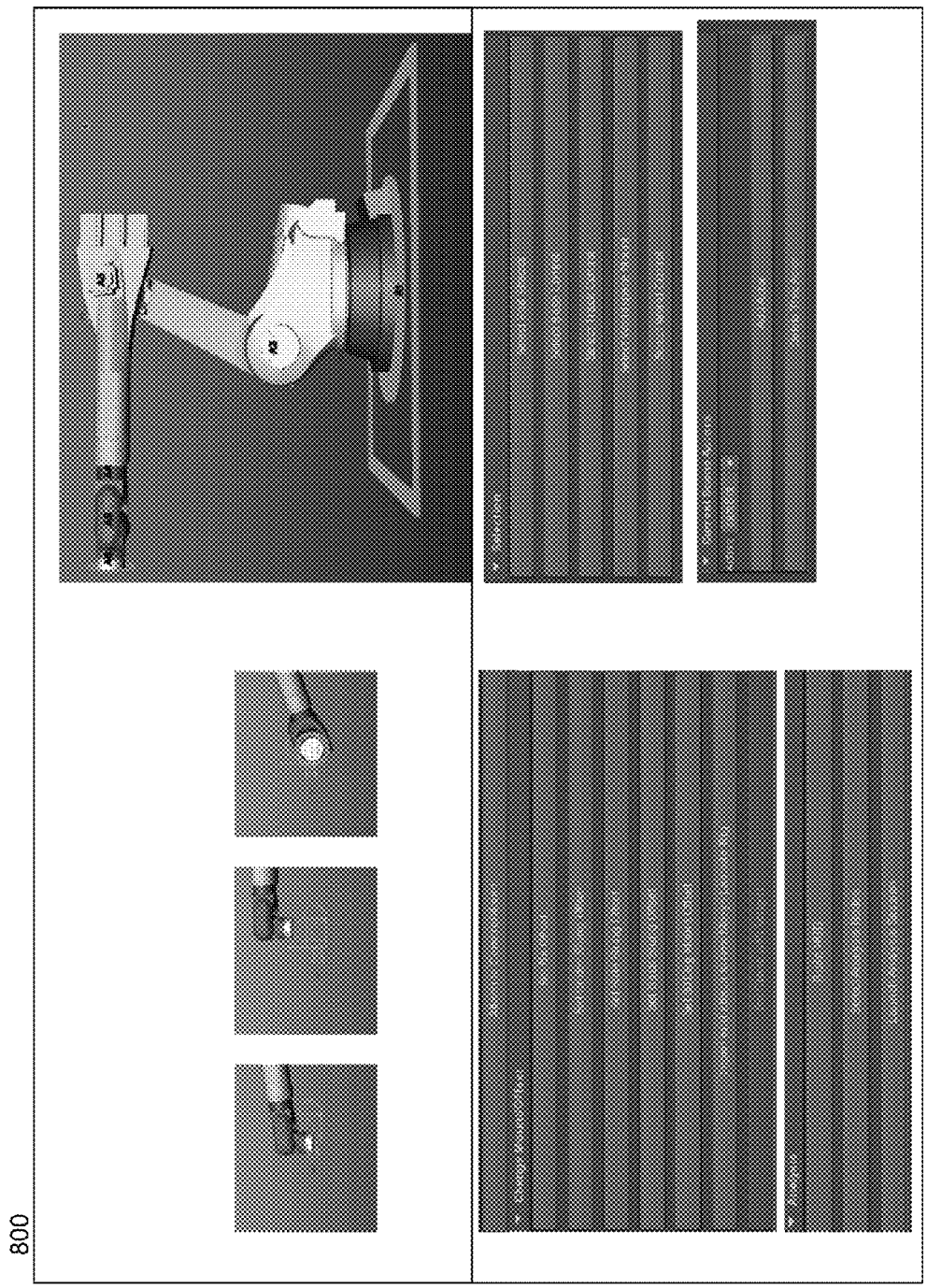
FIG. 8 illustrates a potential user interface for a software control, according to an example embodiment.

FIG. 8 illustrates one potential embodiment of a user interface 800 in a software control for use with a motion control photography system. Such an interface may enable a number of functions, including modeling of individual device actors, software control of individual device actors, creation of control data for individual device actors, and recording control or operation data for individual device actors. Similarly multiple devices is modeled simultaneously to model, control, or record operation of an entire motion controlled set using an interface such as user interface 800.

User interface 800 may include an actor panel with a plurality of interface buttons including an "actors" drop down menu to show a list of the current device actors is a scene, and "add actor" scene to bring up a prompt which allows selections of a name and/or type of device actor to be created or added to a scene, and a "delete actor" interface to allow deletion of an actor from a scene.

User interface 800 may also include a selection panel. A selection panel may include an interface for "Select End Effector" which selects a controller on the robot which allows the user to drive the robot via a wrist. This controller, when selected and viewed through channel box editor, may house additional attributes that the user can control. These attributes may include:

Visibility—Toggles the visibility of the controller in a view port.
Disable Heads up Display (HUD) Updates—Disables all HUD updates in a view port.
A(1-6) Angle—Displays the current angle of each respective robot axis.
Track Robot (TR) Position—Displays the position of robot on the track axis.
Show Axes—Toggles the visibility of a skeleton in a view port.
FK IK (A1-A6)—Allows the switching settings for of individual joints.

A selection panel may also include a "select base control" interface which may select a controller on the robot which allows the user to position the robot from the base. Such a controller may, when selected and viewed through the channel box editor, houses additional attributes that the user can manipulate such as:

Translate Z—Moves the base along the track system.
Rotate Y—Changes the orientation of the base.
Column Height—Changes the base height of the robot.

A selection panel may also include additional interface controls such as:

Select Track Control—Selects a controller on the robot which allows the user to move and orient the track system to their liking. further describe the disconnect between the end effector and this node.
Select Worldspace Mount—Selects a controller for adding a mount.
Select World Controls—Selects a master controller which allows the user to move and orient the entire robot and track system together.

Additionally, user interface 800 may provide controls for adding and removing mounts to device actors within the software system, and for setting placement for mounts that are added to device actors. For example, FIG. 8 shows three potential positions for mounting a camera to a robot arm that is a device actor in the current system. The user interface 800 may provide graphical or number input selections for choosing between various mounting options, and for adjusting the position variables associated with such a setting.

In one potential embodiment of a motion control photography system, user interface 800 is integrated through a software control to a camera robot such as software control 657 and camera robot 670 of FIG. 6 to enable an automated system calibration. One potential such calibration comprises a lens node calculation for determining a calibrated lens position in a camera mounted to a robot arm. One potential embodiment of such a calibration comprises providing software control 657 with information regarding the location and dimensions of a base, wrist or joint elements, and camera mounts for camera robot 670. A calibration player with known characteristics such as location and size is also provided. When a calibrate command is selected via software control 657, camera robot 670 records a plurality of images of the calibration player from different camera angles or locations. The images in conjunction with known data regarding the calibration player and camera robot 670 allows the lense node of the currently mounted camera to be calculated and incorporated into the device actor modeled in software control 657.

In an alternative embodiment of a calibration, software interface 800 may have a calibration command for altering size or location data in response to feedback from a temperature sensor. For example, software control 657 is receive data via digital output bank 658 from a temperature sensor attached to a rail that is part of camera robot 670. Software control 657 is configured to adjust command signals due to known changes in rail characteristics over temperature, or is configured to signal a need to measure changes in device actor locations in response to temperature changes.

Figure 9:
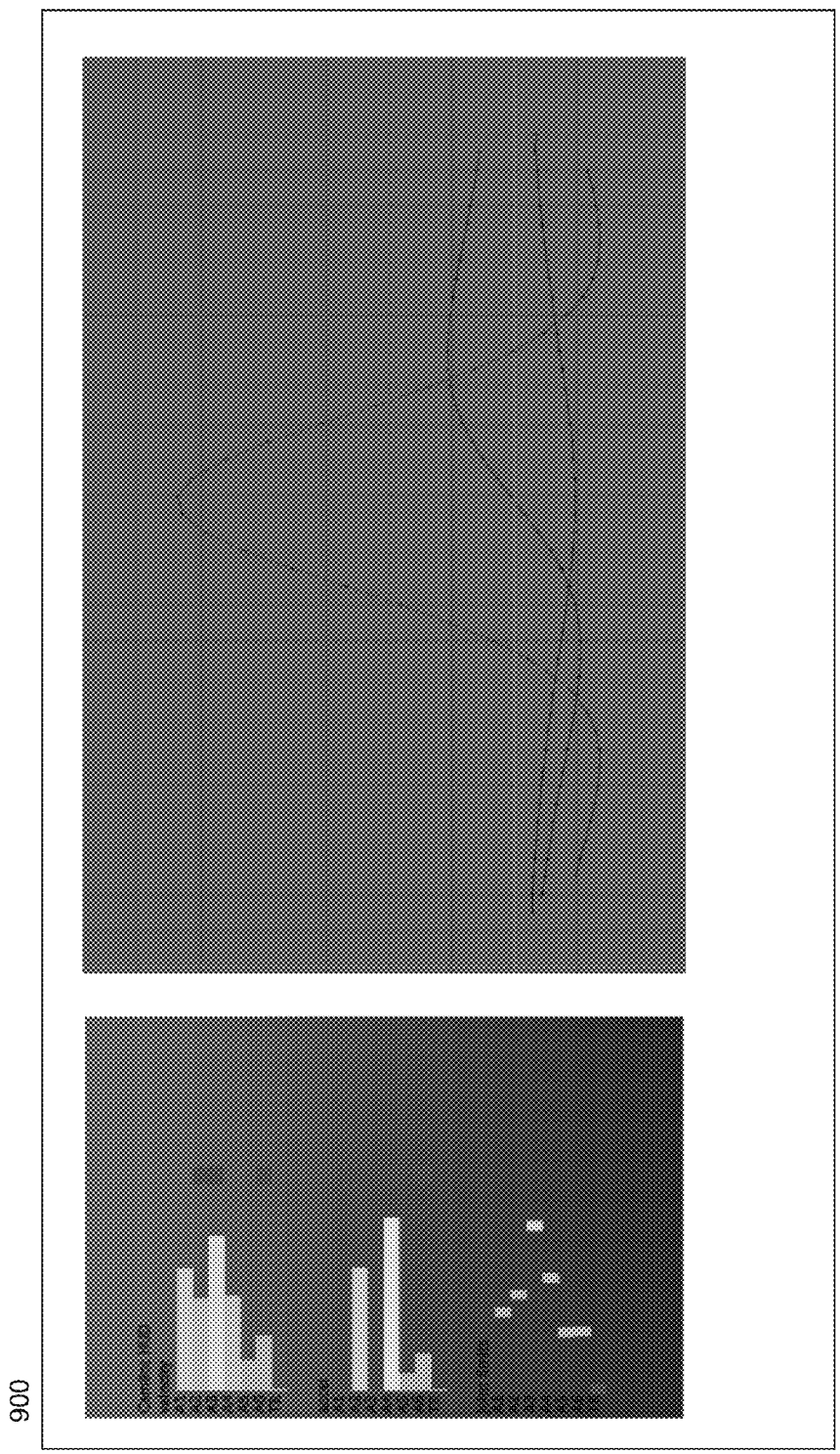
FIG. 9 illustrates a potential user interface for a software control, according to an example embodiment.

A software control such as software control 26 of FIG. 1 or software control 657 of FIG. 6 may also comprise an analysis interface such as analysis interface 900 of FIG. 9. Analysis interface 900 shows movement data for individual axis of a device actor. Data such as current velocity and current acceleration is displayed, along with graphs of these characteristics over time through a scene, maximum allowable limits for each characteristic, and maximum achieved value for each characteristic. The values presented in analysis interface 900 are modeled from a global timeline created within a software control or recorded in a database. The values may also be values recorded from the actual physical motion of device actors playing through a scene. Use of such analysis data may provide for modifications to be made to a scene while quickly verifying that safe limits of device actor function are not mistakenly exceeded.

In addition to analysis of operation of individual device actors, software control is used for preventative safety in detecting potential collisions between device actors in modeling the motion of the actors through a global timeline. Further, such modeling of a scene through a global timeline is used to set safety parameters for a safety system such as master safety control 690 of FIG. 6. Modeling of locations and velocities of device actors through a global timeline may enable identification of unsafe zones and unsafe times in an area or set around a motion control system. Such an identification is used to set sensing triggers of object detectors that are part of the safety system described above. For example, if an area within 5 feet of a certain device actor is determined to be at risk of collision, and a buffer zone of 10 additional feet is required to insure safety during operation, a LIDAR detector is configured to detect unexpected objects and movement within a 15 foot area of the device actor during operation, and to automatically create a safety shutdown if an object is detected. In an alternative embodiment, the LIDAR detector is configured to create a warning signal if an object is detected in a periphery of the danger zone, and only to create a shutdown if the detected object is moving toward a potential impact zone.

In an alternate embodiment, a software control includes modeling of actors and models of defined safe zones. Analysis of the motion of the actors in software control allows a modeled safety check to see if any actor collides with a defined safe zone. Safe zones are defined by entry of fixed volumes of space into software control, by image capture of a set location. Safe zones may also be defined to be variable based on a detected motion, jerk, velocity, or acceleration of an object in a safe zone. In an alternate embodiment a safe zone is defined by input from transponder device data. For example, a transponder location device is attached to a player, and a safe zone defined by a distance from the transponder. The transponder feeds location data to software control, which may update safe zones within a software control or within a master safety control. In another embodiment, fixed safe zones are defined within software control, and published prior to a safety PLC within master safety control prior to operation of the motion controlled set.

A method 1100 is provided for causing a robotic device to move a robot tool along a motion path that corresponds to the motion path of a demonstration tool. In some examples, method 1100 may be carried out by a control system, such as master control 12 as described in reference to FIG. 1, in communication with one or more cameras that make up part of a motion capture system. In further examples, a robotic device may also receive instructions from the control system (e.g., a computer workstation with network connections to the robotic arm and the motion capture system). The robotic device may be operable with six degrees of freedom, or a different number of degrees of freedom. For instance, the robotic device may be a device actor within device actors 40 as described in reference to FIG. 1, device actor 242 as illustrated and described in reference to FIG. 2, device actor 342 as illustrated and described in reference to FIG. 3A, 3B, and/or 3C, and/or device actor 442 as described in reference to FIG. 4B. In other examples, part or all of method 1100 may be carried out by the robotic device itself. Additionally, while examples with a single robotic arm may be described, various alternative embodiments may include any number of robotic arms, or may include other automated systems integrated with at least one robotic arm.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 11. Where used, program code can be stored on any type of computer-readable medium, for example, such as a storage device including a disk or hard drive.

Figure 11:
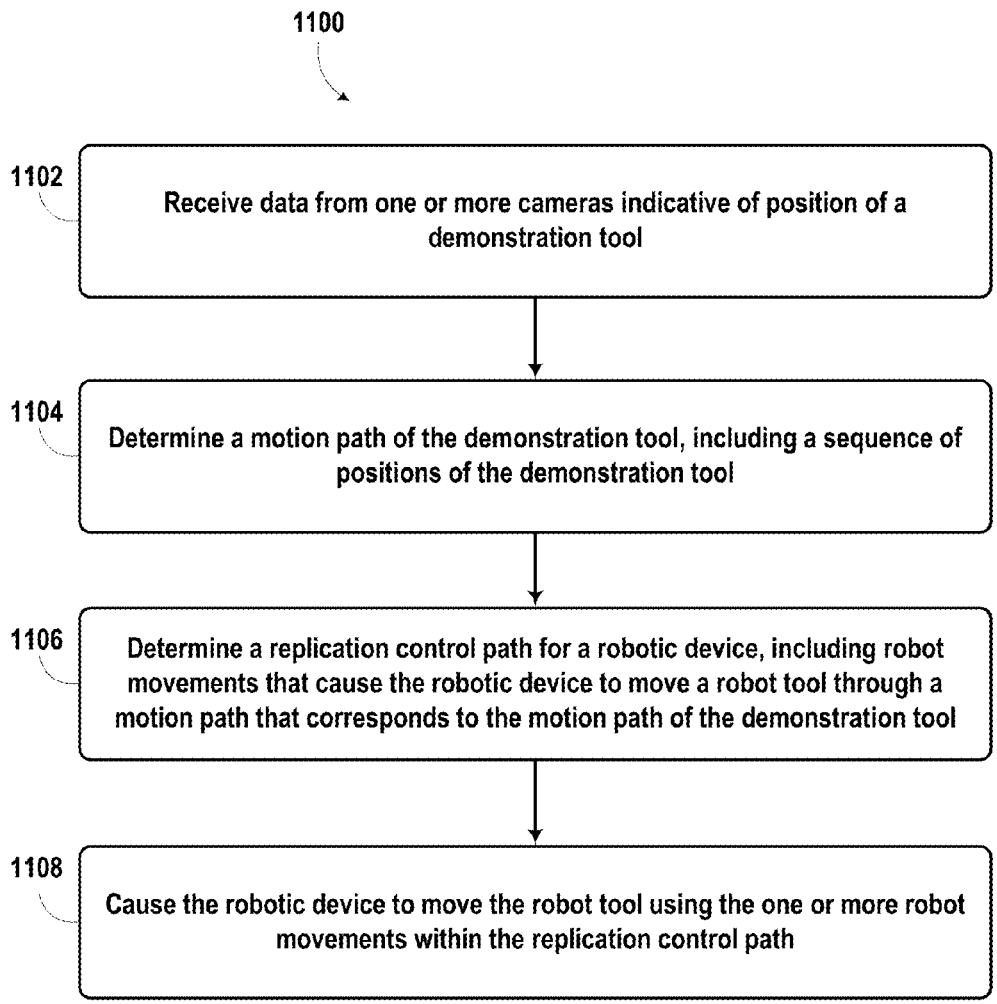
FIG. 11 is a block diagram of a method, according to an example embodiment.

In addition, each block of the flowchart shown in FIG. 11 may represent circuitry that is wired to perform the specific logical functions in the process. Unless specifically indicated, functions in the flowchart shown in FIG. 11 may be executed out of order from that shown or discussed, including substantially concurrent execution of separately described functions, or even in reverse order in some examples, depending on the functionality involved, so long as the overall functionality of the described method is maintained.

As shown by block 1102 of FIG. 11, method 1100 may initially involve receiving data from one or more cameras indicative of position of a demonstration tool. The demonstration tool may be any object moving through space such that positions of the object may be determined based on sensor data received from a camera. In some examples, the demonstration tool may be a tool that is used by a human demonstrator. For instance, the tool may be a camera, a welding iron, a glue gun, a metal buffer, a pen, a paint brush, or a different type of manufacturing or design tool. Example methods may be particularly useful for types of activities that may benefit from nuanced human skill, such as the skill of an expert welder.

In order to capture data indicative of the position of the demonstration tool, a number of different types of motion capture systems may be used. In some embodiments, a motion capture system may employ a set of control markers on the demonstration tool that can be detected by one or more cameras. For instance, the motion capture system may use multiple linear detector based cameras that function in conjunction with active light emitting diode (LED) markers. Such LEDs may function in a variety of environments, including indoor and outdoor environments. They may additionally operate with minimal or no external light sources, since they provide a light source that may be detected by the cameras. Further, individual LEDs may have distinguishing characteristics, such as an output wavelength or a unique modulation pattern of output light that allows each marker to be distinguished from other markers. A camera may then distinguish movements of individual points on a demonstration tool, which may provide additional precision in determining positions of the demonstration tool and/or enable an individual LED to be identified by a single camera if some of the markers are occluded.

Other embodiments may use other computer vision systems, such as a computer vision system that detects passive markers which are not powered and are not implemented with electronics. Passive markers may be, for example, ink markings or colored objects attached to a surface. Unlike the active LED markers described above, the passive LEDs may require certain external lighting levels to be detectable by a camera. Further alternative embodiments may use a mixture of active and passive markers, and may use any number of cameras.

Figure 12A:
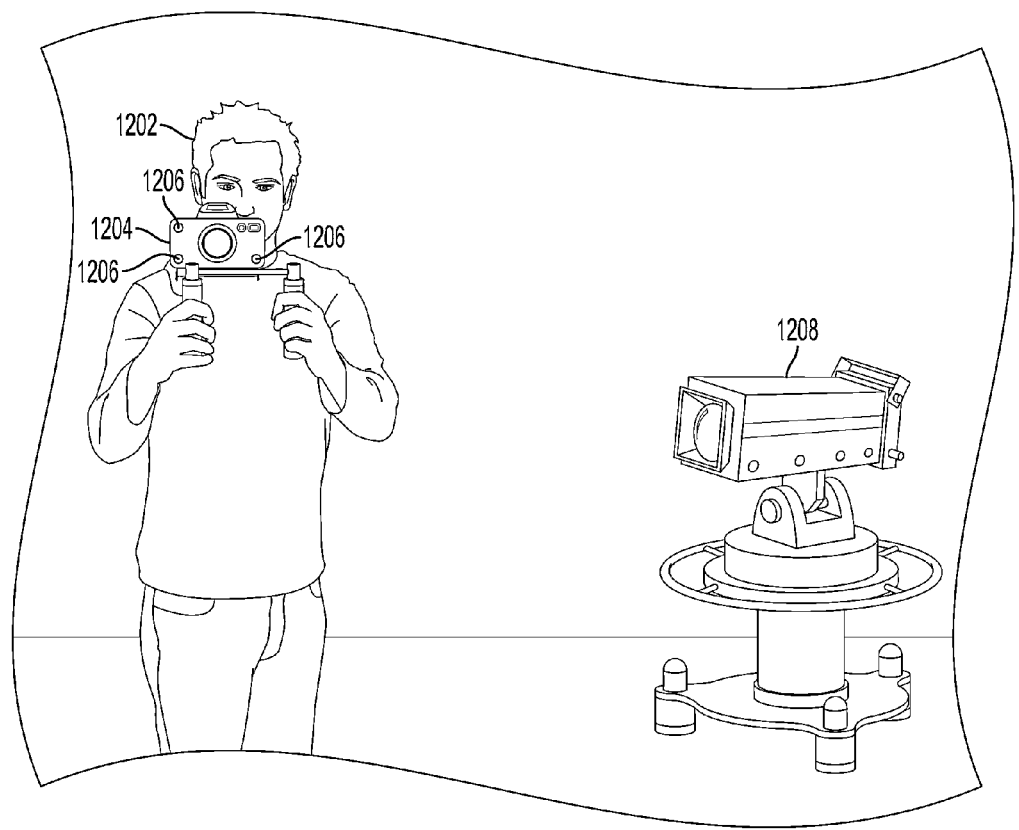
FIG. 12A illustrates a motion capture system and a human actor with a demonstration tool, according to an example embodiment.

FIG. 12A illustrates a motion capture system and a human actor with a demonstration tool, according to an example embodiment. As shown, a human actor 1202 may be controlling a demonstration tool, a camera 1204 in this example. A shoulder-mounted apparatus for controlling the camera 1204 is shown here, but any type of movable camera (e.g., a handheld camera) could be used as well. Additionally, the camera 1204 may contain one or more control markers 1206, which may be any of the types of control markers described above in the context of a motion capture system. A camera 1208 may be used to capture data about the position of the demonstration tool and/or particular points on the demonstration tool corresponding to the markers 1206. The camera 1208 is shown in this example as a free-standing camera on the floor, but cameras mounted in other ways and/or multiple cameras may be used in other examples as well.

Method 1100 may additionally involve determining a motion path of the demonstration tool, as shown by block 1104. The motion path of the demonstration tool may include a sequence of positions (e.g., translations and orientations) of the demonstration tool as it moves through space. In some examples, the demonstration tool may be moved by a human actor while the sensor data indicative of the demonstration tool is received. In further examples, the position of the demonstration tool may be captured at a particular time interval (e.g., 100 times per second or 1,000 times per second). In additional examples, the motion path may include a sequence of cartesian coordinates and rotation angles indicating the position of the demonstration tool over time.

Figure 12B:
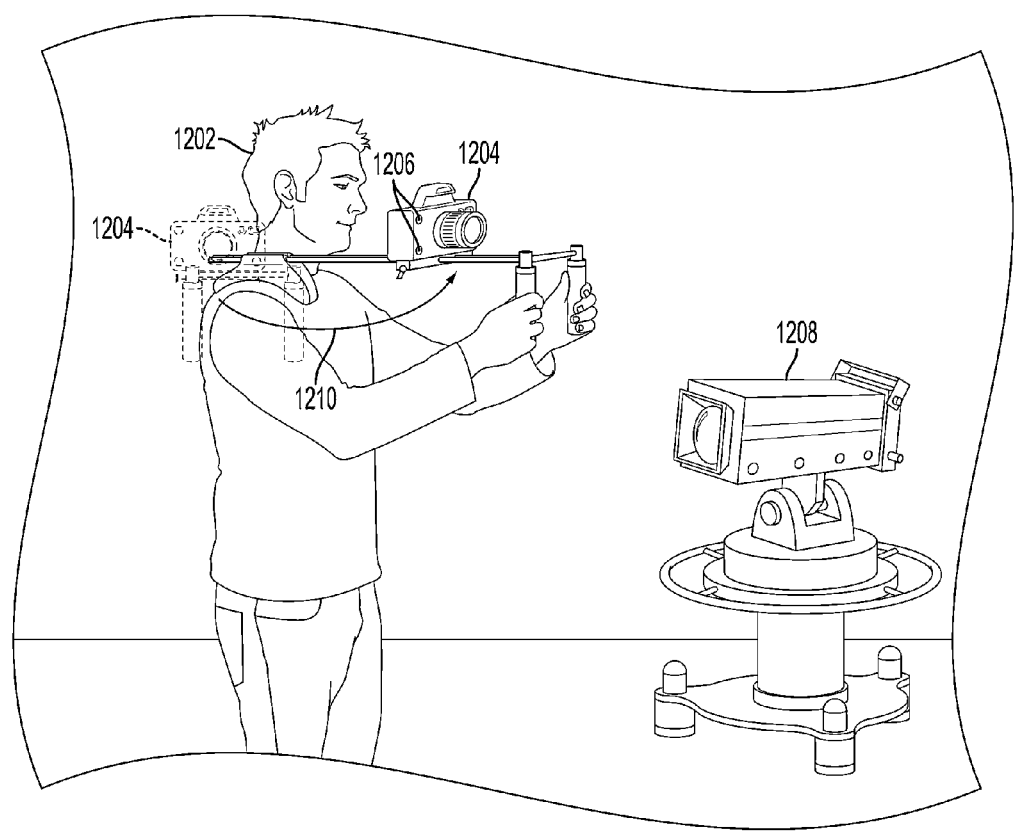
FIG. 12B illustrates a motion path of a demonstration tool, according to an example embodiment.

FIG. 12B illustrates a motion path of a demonstration tool, according to an example embodiment. A human actor 1202 may control a camera 1204 by moving the camera 1204 within space (e.g., to film a scene of a movie). A camera 1208 operating as part of a motion capture system may capture movements of the camera 1204 as the camera 1204 moves through space. For instance, the position of the camera 1204 (and/or control markers 1206 on the camera 1204) may be recorded a certain number of times per second (e.g., 100 times per second), and the sequence of positions of the camera 1204 may define a motion path 1210 of the camera 1204 through space. The motion path 1210 is shown here as an arc through space, but could involve more complex and nuanced movements in multiple directions as well. For example, motions of a welding pen may be recorded that may involve nuanced movements in many different directions during a fabrication process to produce a manufactured output product.

In some examples, a user may view a visual simulation, or real-time preview, of the robotic arm achieving the same position as the demonstration tool with its end-effector-mounted tool during recording. In some examples, this preview can be viewed on a separate workstation. In other examples, the preview may be viewed on a screen attached to the demonstration tool itself. For instance, if the demonstration tool is a camera, a sub-window of a viewing window of the camera may show a preview of how the robot will move in order to replicate movements of the demonstration tool with its own robot tool.

In additional examples, the preview may include a real-time data stream of one or more numerical values associated with positions and/or movements of robotic device. The preview may also provide information about the robot's ability to replicate the motion path currently being demonstrated. For instance, the preview may send a warning signal when the motion path of the robot tool would approach or exceed a predefined constraint of the robotic device. Examples of displayed information may include the robot's joint positions, joint velocities, and joint accelerations relative to the robot's physical limits, as well as warnings about singularities and unreachable configurations.

In further examples, the user may be able to start and/or stop recording by pressing a button on the demonstration tool or at another location (e.g., on a workstation). For instance, data indicative of position of the demonstration tool may only be recorded or received when the button is depressed. Accordingly, a user may be able to use the demonstration tool to record a discrete motion sequence by holding down the button from the start of the motion sequence to the finish of the motion sequence.

By pressing buttons on a workstation and/or the demonstration tool itself, the user may also be able to adjust certain parameters of the recording and/or the preview of the robot movements. For example, one button may clear the current recording. Another button may switch the perspective used for the preview screen. Another button may enable or adjust a smoothing filter to apply to the demonstrated motion path during recording. For instance, motion curves within the motion path may be smoothed in order to prevent jerking movements or quick jumps between disconnected positions of the robot tool.

In additional embodiments, movements of the demonstration tool may result from physical forces, such as gravity, in addition to or instead of a human demonstrator. For instance, the demonstration tool may be a ball that is dropped, or thrown, or allowed to bounce on the ground. A robotic device may then be programmed to control an end-effector-mounted tool to move in much the same way as the ball to simulate the effect of physical forces on the ball. In another example, the demonstration tool may be a part of a car, and example systems may allow a robotic device to simulate certain effects of a car crash by recording and replicating movements of car part during a test crash. Other types of natural phenomena involving movements that are difficult to program directly may be captured and used to control robot movements in accordance with the systems and methods described herein as well.

Method 1100 may additionally include determining a replication control path for a robotic device, as shown by block 1106. The replication control path may include robot movements that cause the robotic device to move a robot tool (e.g., an end-effector-mounted tool) through a motion path that corresponds to the motion path of the demonstration tool. Movements of the robot's joints may be determined for the robot device that place the robot tool at particular positions in space at particular points in times that correspond to positions of the demonstration tool within its motion path. In some examples, a motion control system, such as described above with respect to FIG. 1 and/or FIG. 6, may be used to determine movements of the robotic device in order to position the robot tool at points in time along a timeline.

In further examples, a sequence of robot joint parameters, including joint angles, velocities, and/or accelerations, may be determined for the robot that locate the position and orientation of the robot's end effector over time in order to position the robot tool within space. In some examples, a direct mapping between joint parameters of the robot and positions of the robot tool at particular timestamps may be determined. In other examples, rather than a direct mapping, robot joint parameters may be determined in order to approximate the position of the robot tool. For instance, robot movements may be modified in order to smooth motion curves of the robot and/or of the robot tool in order to avoid jerking or disconnected movements while the robot is moving the robot tool.

In some examples, the motion path of the robot tool corresponding to the motion path of demonstration tool may contain positions of the robot tool that directly map to positions of the demonstration tool. In other examples, the motion path of the robot tool may be scaled up or down in size relative to the motion path of the demonstration tool. For instance, positions within the motion path of the robot tool may be scaled to account for differences in size between the demonstration tool and robot tool (and/or between a human demonstrator and a robotic device).

In further examples, the replication control path may be refined before the robot is controlled to replicate the movements of the demonstration tool. For instance, a review phase may be used during which the user may review the recorded motion path, validate it, and/or make adjustments. For instance, a user may be presented with a software environment that allows the user to visualize and control device actors, such as software control 657 described above with respect to FIG. 6. During a review phase, the user may have the ability to apply various filters to the motion path such as smoothing, interpolation, and speed adjustment. Data streams visible during the demonstration phase may also be visible during this phase, so that as the user makes adjustments, the user may see real-time feedback about the robot's ability to perform certain motions. In some examples, once the user has validated the motion, the user may enter a confirmation before moving on from the review phase.

Figure 12C:
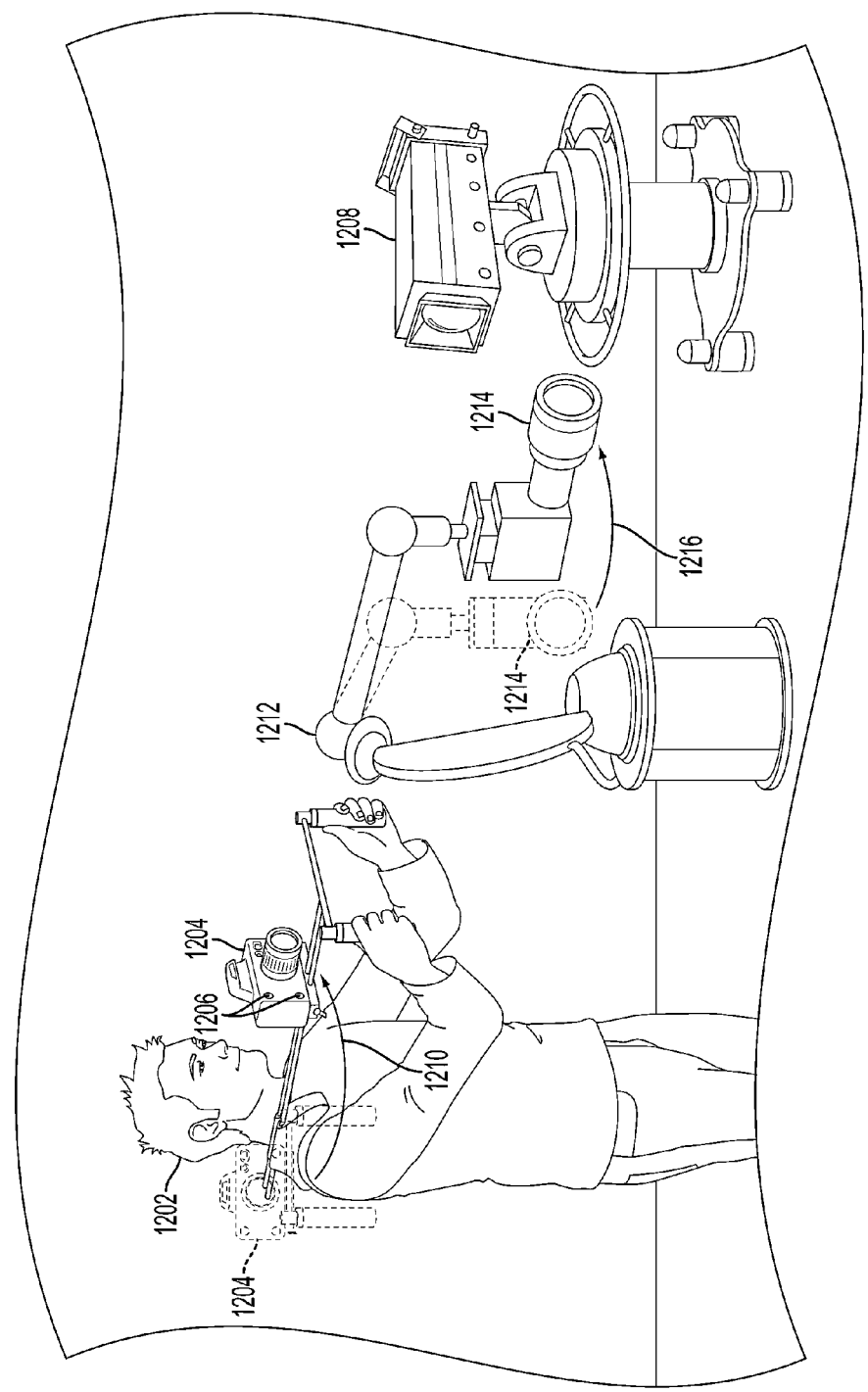
FIG. 12C illustrates a motion path of a demonstration tool and a corresponding motion path of a robot tool, according to an example embodiment.

FIG. 12C illustrates a motion path of a demonstration tool and a corresponding motion path of a robot tool, according to an example embodiment. A human demonstrator 1202 may move a demonstration tool (camera 1204) through a motion path 1210. A motion capture system may employ a camera 1208 to determine positions of the moving camera 1204 over time, possibly by detecting changes in positions of control markers 1206 attached to the camera 1204. Additionally, a robotic device 1212 may be equipped with a robot tool (end-effector-mounted camera 1214). A motion path 1216 may be determined for the robot tool 1214 that contains positions of the robot tool 1214 that correspond to positions of the demonstration tool 1204 within motion path 1210. A replication control path for the robotic device 1212 may then be determined, which includes movements of the robotic device 1212 that move the robot tool 1214 through the motion path 1216.

Method 1100 may additionally involve causing the robotic device to move the robot tool based on the replication control path, as shown in block 1108. In particular, the robotic device may follow the robot movements sequentially within the replication control path to control an end-effector-mounted tool to match the recorded motion of the demonstration tool. If the demonstration tool was a camera used to film a scene of a movie, the robot tool may then be used to film another iteration of the same scene. As another example, if the demonstration tool was a manufacturing tool used to fabricate an output product, robot tool may then be used to fabricate another copy of the output product.

Figure 12D:
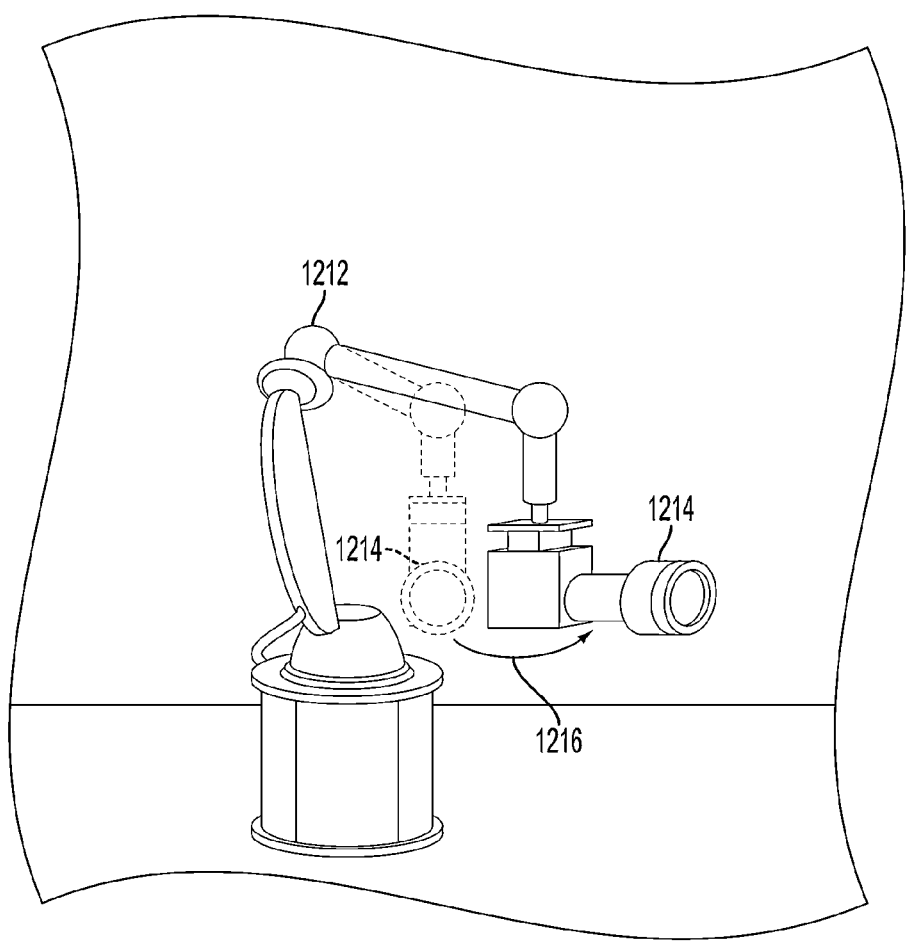
FIG. 12D illustrates a motion path of a robot tool, according to an example embodiment.

FIG. 12D illustrates a motion path of a robot tool, according to an example embodiment. In particular, the robotic device 1212 may be controlled to move the end-effector-mounted camera 1214 through motion path 1216. Once the robotic device 1212 has been trained to control the camera 1214 with this motion, it may replicate the process multiple times. For instance, the robotic device 1212 may be used to film dozens or more takes of a single scene within a movie using the same motion path 1216 for camera 1214.

Particular example applications may include manufacturing, where a user quickly teaches a welding or gluing path to the robot by demonstrating it with a hand-held demonstration tool. A user may thus use a pen, marker, or any other device to trace a path that is trackable by the motion control system. A robot may then be automatically programmed to replicate that movement. A review process may be used to adjust the pattern, or to change speed settings appropriate to a particular application. For example, if a glue system is applying excessive glue, the robot movement may be increased without adjusting the flow of glue to lessen the amount of glue at any given area.

Other examples involve cinema, where repeatable handheld camera moves can be achieved by demonstrating the move first with, for example, a handheld digital single-lens reflex camera, then replicating it with a film camera. In a real-time workflow, visual effects such as scaled camera moves can be achieved by slaving the robot's camera to the demonstration camera. Additional examples in design or architecture may involve fabrication of repeatable organic shapes by demonstrating the shape first with a handheld tool like a paintbrush. Yet further examples exist in ride programming, where a user can quickly program a motion base for an amusement park ride by demonstrating the motion first with a maquette of the ride. A number of different possible applications of the systems and methods described above will be apparent to a person of ordinary skill in the art.

While the robotic device moves the robot tool according to the replication control path, a user may use any of the tools of a motion control system as described above with respect to FIG. 1 and FIG. 6 to control playback of the recorded motion path. In some examples, a real-time workflow may be used to similar ends. In particular, the robot's end-effector-mounted tool may match the motion of the demonstration tool in real time or close to real time (with some offset in position, orientation, or time to avoid collision). Whether playback occurs in real time or at a later time, certain aspects of the system may need to be calibrated by find relative transformations between the coordinate frames of different components.

In some examples, the coordinate frame of a motion capture stage relative to the coordinate frames of one or more motion capture cameras may be determined. In other examples, the coordinate frame of the robotic arm relative to the coordinate frame of the motion capture stage may be determined. In further examples, the coordinate frame of the demonstration tool relative to the coordinate frame of the LED markers attached to it may be determined. In yet further examples, the coordinate frame of the robot's tool relative to the coordinate frame of the robot's end effector may be determined.

In examples where the demonstration tool or the robot tool is a camera, the system may also calibrate transformations from the 3D world to the 2D image plane of the camera. This may require calibrating various intrinsic parameters of the camera such as field-of-view and distortion parameters, as well as extrinsic parameters such as the camera's orientation relative to the end effector.

To calibrate the relative positions of the motion capture cameras, the system may use a built-in calibration routine that involves moving a calibration object around the stage. For calibration of the robotic arm relative to the motion capture stage, LED markers may be attached to the robot. The robot may then be commanded to move one or more of its joints or points of movement. For certain joints the movement may be along a circular path. For other joints the movement may be along a line or throughout a swept volume. The motion-capture coordinates of the markers may be recorded during the movement, and then the system may mathematically derive the position of the robot's base coordinate frame given the marker data. This may be done repeatedly to calibrate and identify the potential movement of all joints of the robot.

For calibration of camera tools, a user or automated system may move the camera to various positions on the stage and take images of a static checkerboard or background. Those images may then be combined with position information from the robot and motion capture system to derive the camera's intrinsic and/or extrinsic properties.

For calibration of non-camera tools a user or automated system may take direct physical measurements, touch the tool off to one static point in space from multiple angles and perform some calculations, or instrument it with LED markers and take position measurements with the motion capture system.

In alternative embodiments, other methods of calibration may be used, including methods that are a hybrid of automatic and manual calibration. Such methods of calibration will be apparent from the above methods of calibration and the description of systems included herein.

In further embodiments, an additional step may be used while the robotic device is moving its robot tool to replicate the positions of the demonstration tool. In such an optional step, movements of the robot tool may be recorded by a motion capture system (which could be the same motion capture system as described above or a different one) in order to determine how accurately the robot's tool is following the recorded motion path of the demonstration tool. Any variations from the expected motion path of the robot tool may be used as an input to a control system making "on-the-fly" adjustments to commanded robot movements in order to achieve better fidelity to the recorded path. This may be useful in the case where the robotic arm is not perfectly accurate. Depending on the application, this "closed-loop" control may function to achieve a desired fidelity to the recorded path during the replication phase.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information, such as a block of method 1100 described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. A computer-implemented method comprising:
receiving position data indicative of position of a demonstration tool;

based on the received position data, determining a motion path of the demonstration tool, wherein the motion path comprises a sequence of positions of the demonstration tool;

determining a replication control path for a robotic device, wherein the replication control path comprises one or more robot movements that cause the robotic device to move a robot tool through a motion path that corresponds to the motion path of the demonstration tool; and providing for display of a visual simulation of the one or more robot movements within the replication control path.

2. The method of claim 1, wherein:
the demonstration tool is a camera used to film a scene; and
the robot tool is a camera used by the robotic device to film a different iteration of the scene.

3. The method of claim 1, wherein:
the demonstration tool is a manufacturing tool used to fabricate an output product; and
the robot tool is a manufacturing tool used by the robotic device to fabricate a copy of the output product.

4. The method of claim 1, further comprising providing for the display of the visual simulation of the one or more robot movements within the replication control path while receiving the position data indicative of the position of the demonstration tool.

5. The method of claim 1, wherein the visual simulation comprises a visual representation of a virtual robot performing the robot movements within the replication control path.

6. The method of claim 1, wherein the visual simulation comprises a warning signal indicating when the replication control path violates one or more predefined physical constraints of the robotic device.

7. The method of claim 1, wherein:
the demonstration tool comprises a display screen; and
the visual simulation is displayed within the display screen.

8. The method of claim 1, further comprising determining one or more refinements to the one or more robot movements within the replication control path in order to smooth one or more curves of robot movements within the replication control path.

9. The method of claim 1, further comprising:
receiving one or more refinements to the one or more robot movements within the replication control path via a user interface; and
updating the displayed visual simulation of the one or more robot movements within the replication control path to reflect the one or more refinements.

10. The method of claim 1, further comprising receiving the position data indicative of the position of the demonstration tool only while a button on the demonstration tool indicative of when to record movements is pressed.

11. The method of claim 1, wherein the motion path of the robot tool comprises scaled positions from the motion path of the demonstration tool.

12. The method of claim 1, further comprising receiving the position data indicative of the position of the demonstration tool from one or more cameras.

13. The method of claim 12, wherein the position data received from the one or more cameras comprises data indicative of position of one or more control markers attached to the demonstration tool.

14. The method of claim 13, wherein the one or more control markers comprise one or more light emitting diode markers.

15. The method of claim 14, wherein:
the one or more light emitting diode markers have a distinguishing characteristic that is distinguishable by the one or more cameras; and
determining the motion path of the demonstration tool comprises identifying the distinguishing characteristic of the one or more light emitting diode markers using the one or more cameras.

16. The method of claim 1, wherein the sequence of positions within the motion path of the demonstration tool comprises a sequence of positions resulting from a force of nature applied to the demonstration tool.

17. The method of claim 16, wherein the force of nature comprises gravity.

18. A system comprising:
a demonstration tool;
a display interface; and
a control system configured to:
receive position data indicative of position of the demonstration tool;
based on the received position data, determine a motion path of the demonstration tool, wherein the motion path comprises a sequence of positions of the demonstration tool;
determine a replication control path for a robotic device, wherein the replication control path comprises one or more robot movements that cause the robotic device to move a robot tool through a motion path that corresponds to the motion path of the demonstration tool; and
cause the display interface to display a visual simulation of the one or more robot movements within the replication control path.

19. The system of claim 18, wherein the control system is further configured to cause the display interface to display the visual simulation of the one or more robot movements within the replication control path while receiving the position data indicative of the position of the demonstration tool.

20. A non-transitory computer readable medium having stored therein instructions, that when executed by a computing system, cause the computing system to perform functions comprising:
receiving position data indicative of position of a demonstration tool;
based on the received position data, determining a motion path of the demonstration tool, wherein the motion path comprises a sequence of positions of the demonstration tool;
determining a replication control path for a robotic device, wherein the replication control path comprises one or more robot movements that cause the robotic device to move a robot tool through a motion path that corresponds to the motion path of the demonstration tool; and
providing for display of a visual simulation of the one or more robot movements within the replication control path.

* * * * *